United States Patent

Zenda

[11] Patent Number: 5,809,245
[45] Date of Patent: Sep. 15, 1998

[54] MULTIMEDIA COMPUTER SYSTEM

[75] Inventor: Hiroki Zenda, Hamura, Japan

[73] Assignee: Kabushiki Kaisha Toshiba, Kawasaki, Japan

[21] Appl. No.: 687,371

[22] PCT Filed: Jan. 23, 1996

[86] PCT No.: PCT/JP96/00111

§ 371 Date: Aug. 2, 1996

§ 102(e) Date: Aug. 2, 1996

[30] Foreign Application Priority Data

Jan. 24, 1995 [JP] Japan .................................. 7-009217
Jan. 24, 1995 [JP] Japan .................................. 7-009220

[51] Int. Cl.$^6$ .................................................. H04N 1/413
[52] U.S. Cl. ............................. 395/200.47; 395/200.32; 395/200.77; 345/334; 345/204; 345/214
[58] Field of Search ...................... 348/403; 364/715.02; 395/200.77, 888, 200.32, 200.67, 200.68, 200.47; 345/334, 204, 214

[56] References Cited

U.S. PATENT DOCUMENTS

| 5,195,092 | 3/1993 | Wilson et al. | 348/13 |
| 5,463,565 | 10/1995 | Cookson et al. | 395/440 |
| 5,583,561 | 12/1996 | Baker et al. | 348/7 |

FOREIGN PATENT DOCUMENTS

| 61-264448 | 11/1986 | Japan . |
| 2-254570 | 10/1990 | Japan . |
| 5-173719 | 8/1991 | Japan . |
| 5-6426 | 1/1993 | Japan . |
| 5-173719 | 7/1993 | Japan . |
| 6-282625 | 10/1994 | Japan . |
| 6-339117 | 12/1994 | Japan . |

OTHER PUBLICATIONS

Reel Magic, Sigma Designs, Feb. 23, 1994, pp. 20–27.

*Primary Examiner*—Thomas Peeso
*Attorney, Agent, or Firm*—Cushman Darby & Cushman IP Group of Pillsbury Madison & Sutro

[57] ABSTRACT

Full-motion video data with a sub-picture and sound is recorded in a DVD-ROM drive. The DVD-ROM drive is connected to an ATAPI interface. Using a data buffer of the ATAPI interface, an MPEG stream is transferred to an MPEG2 decoder on the system board at a variable rate, and video data, audio data, and a sub-picture included in the MPEG stream are decoded by the MPEG2 decoder incorporated in the system. The decoded sub-picture is drawn in a VRAM as in normal VGA graphics. The sub-picture image drawn in the VRAM is synthesized with the video from the MPEG2 decoder by a multimedia display controller and displayed on a screen.

40 Claims, 18 Drawing Sheets

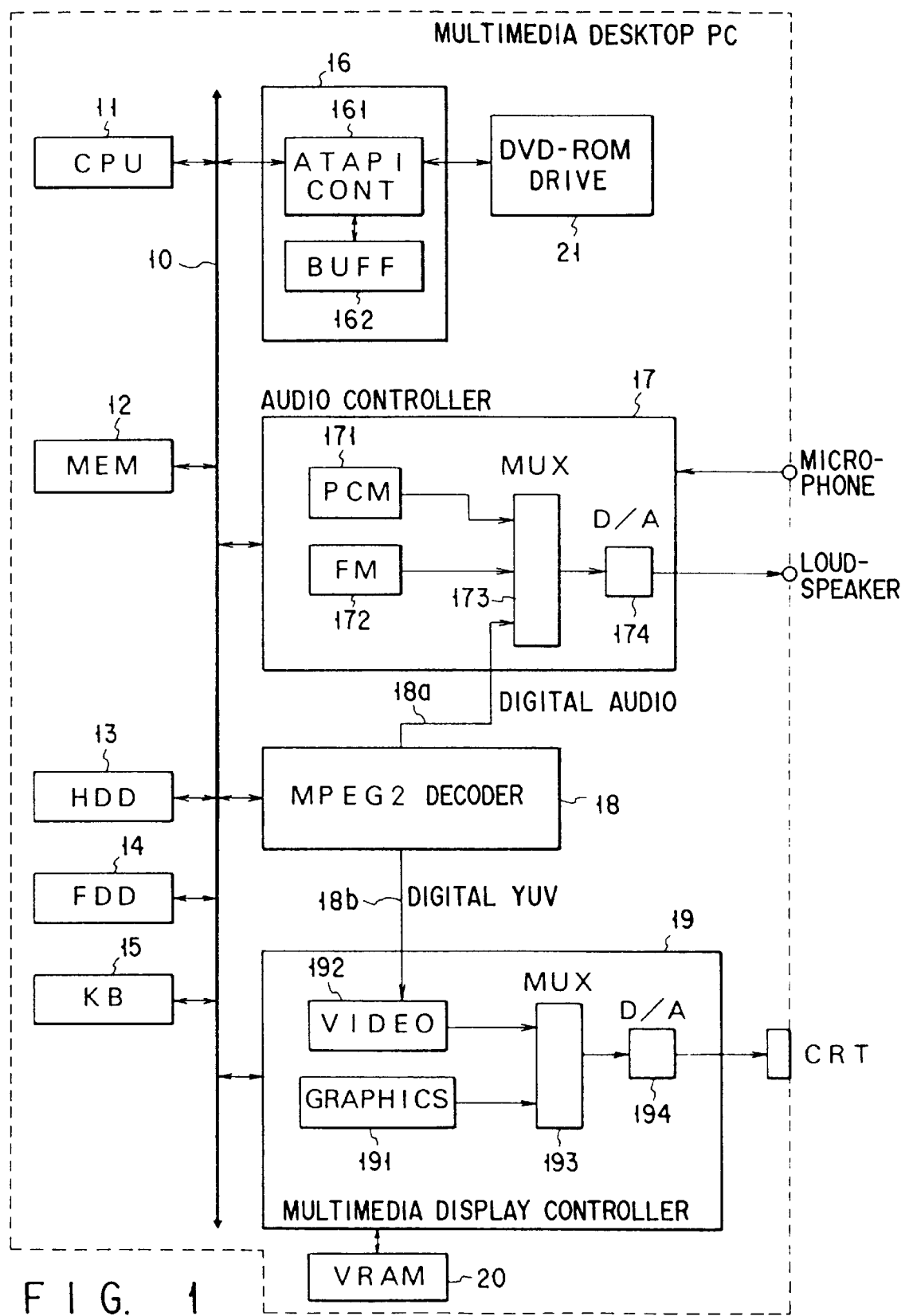
F I G. 1

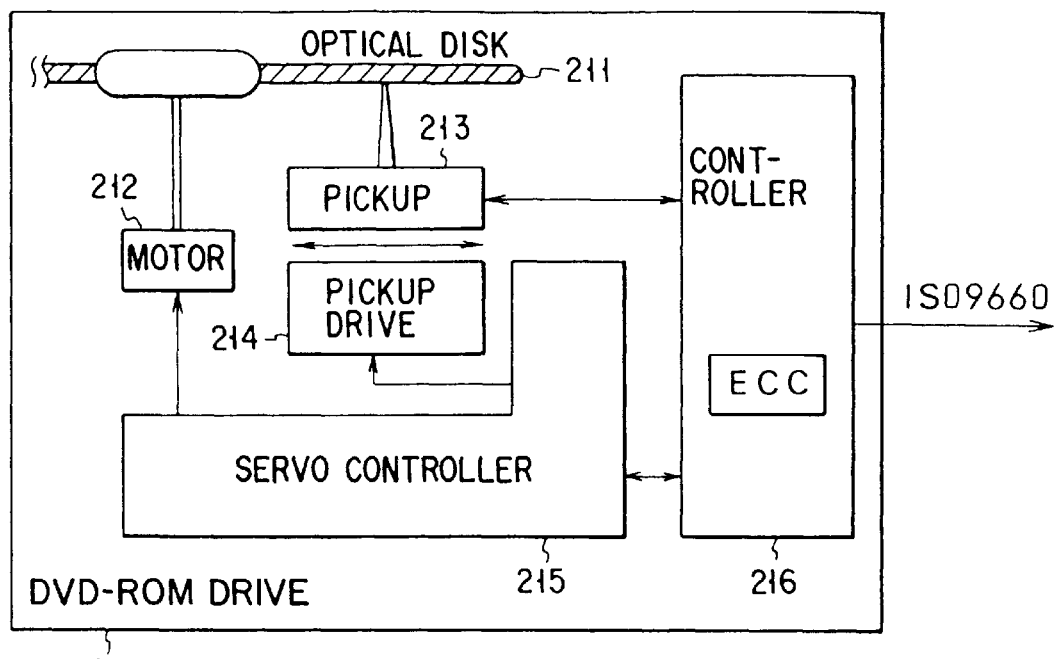
F I G. 2
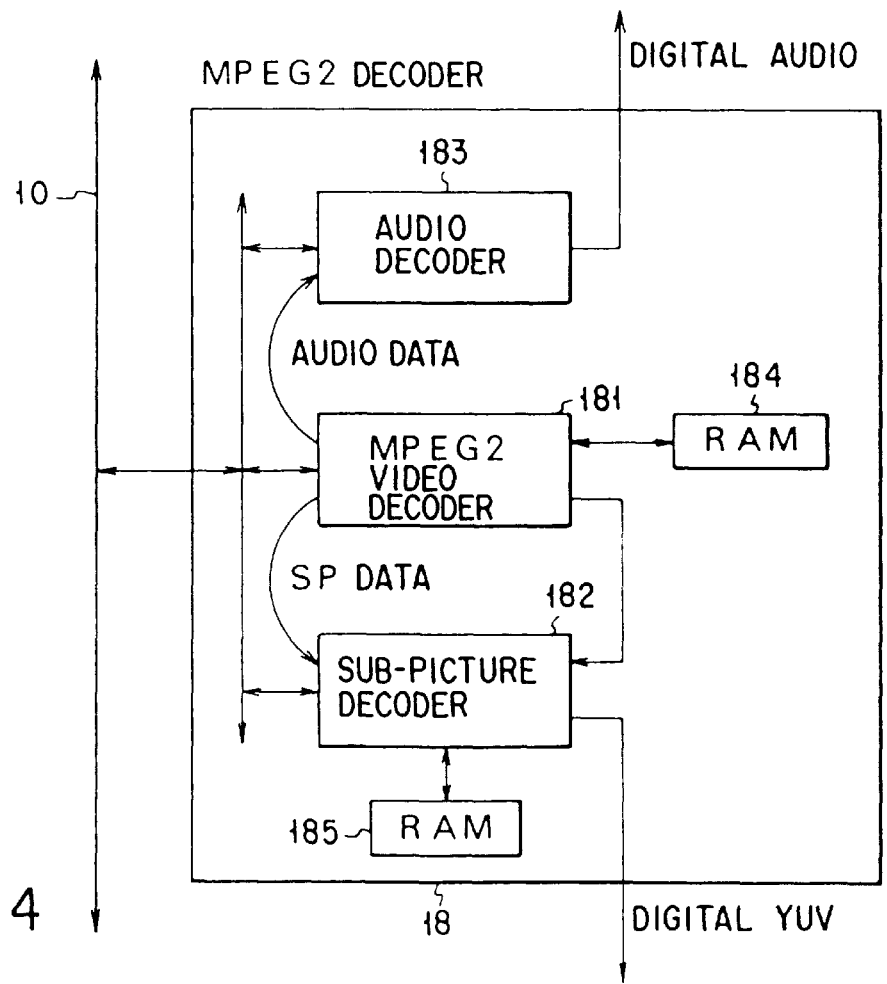
F I G. 4

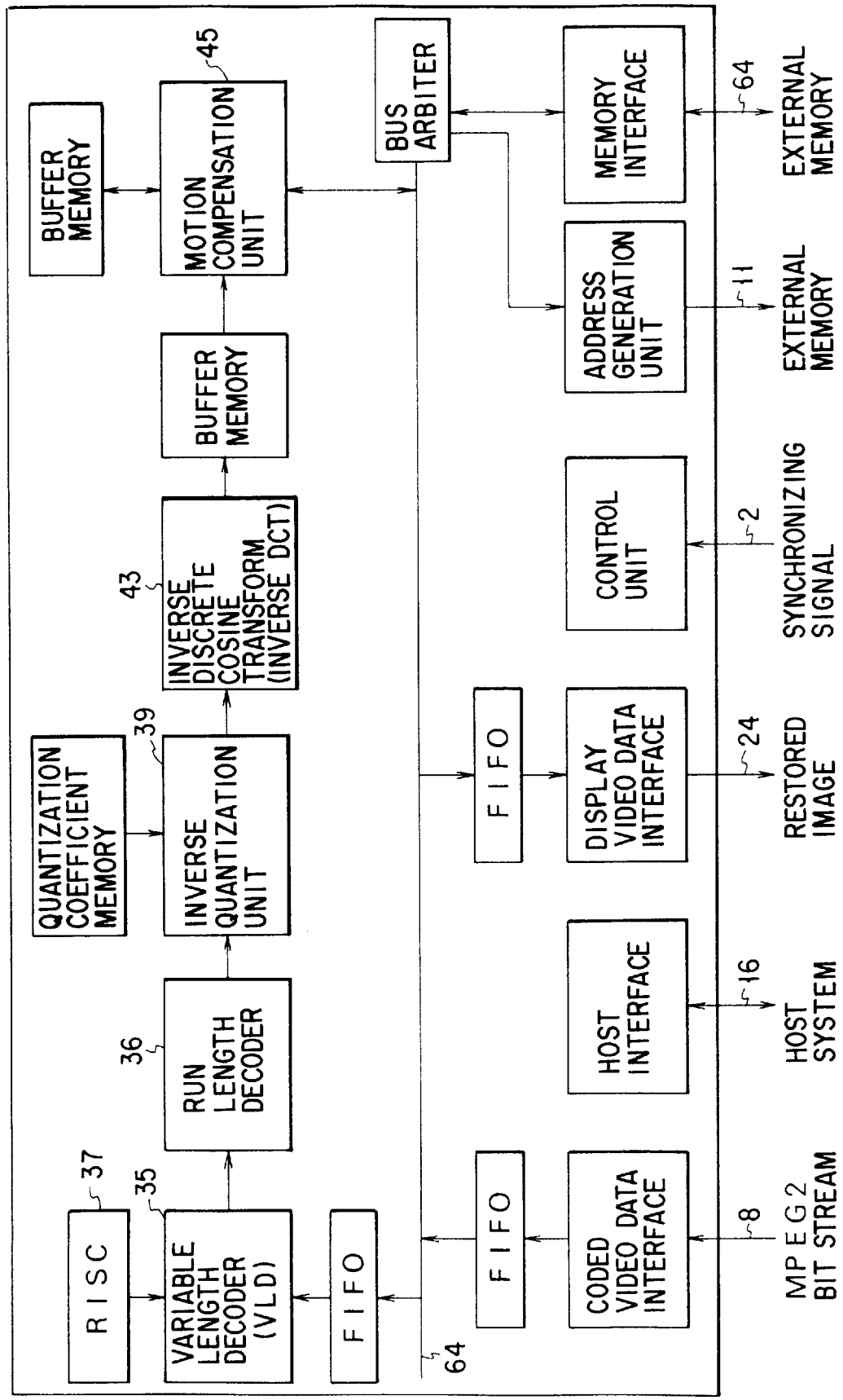
F I G. 7

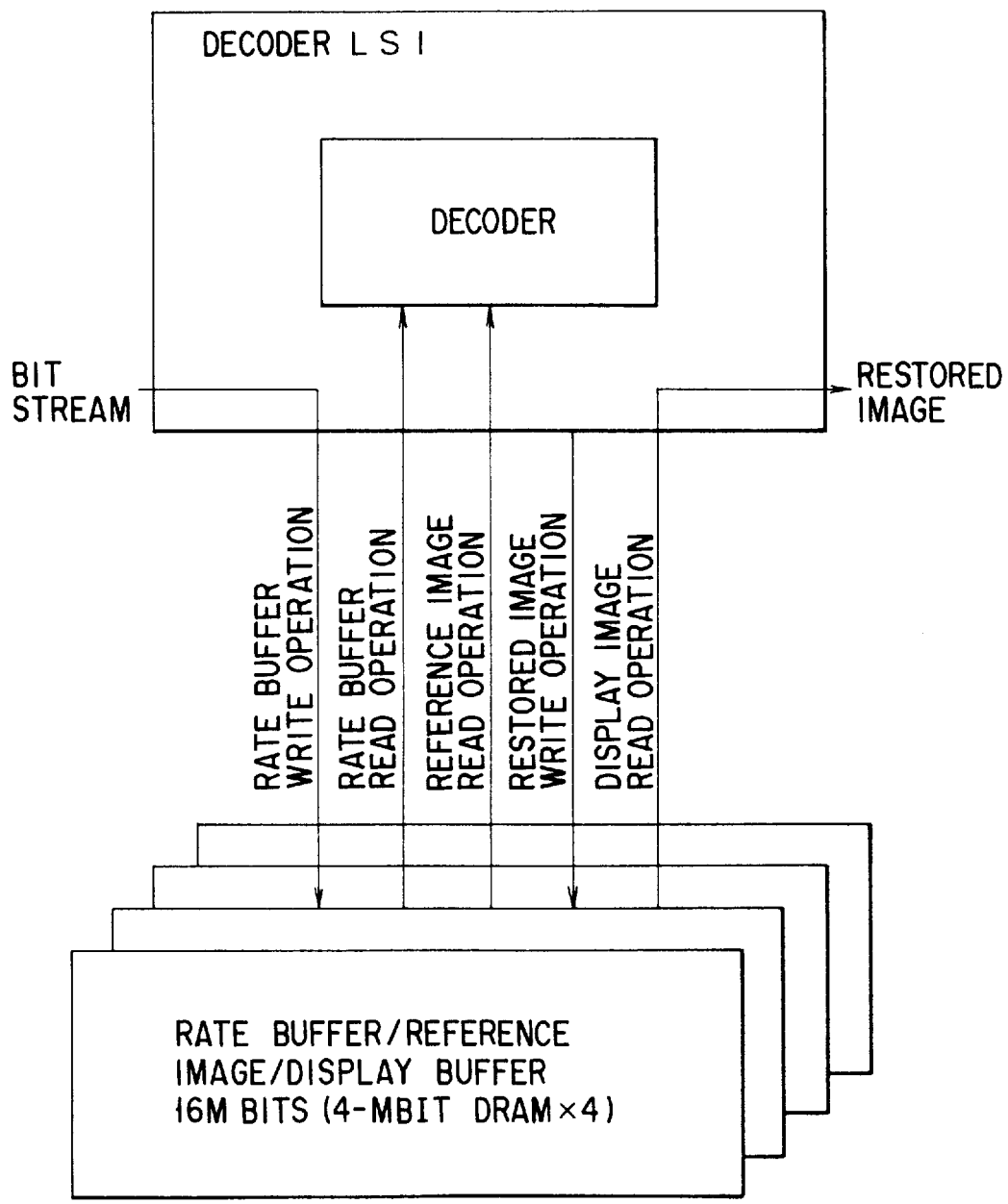
F I G. 9

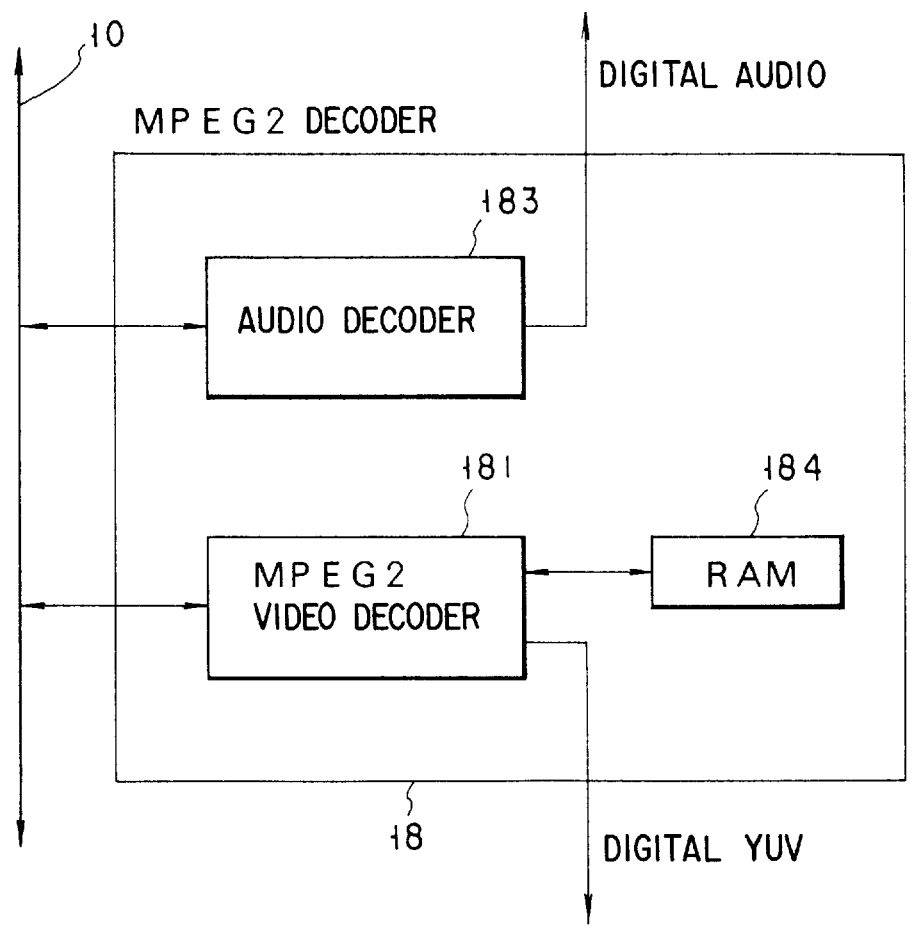
F I G. 16

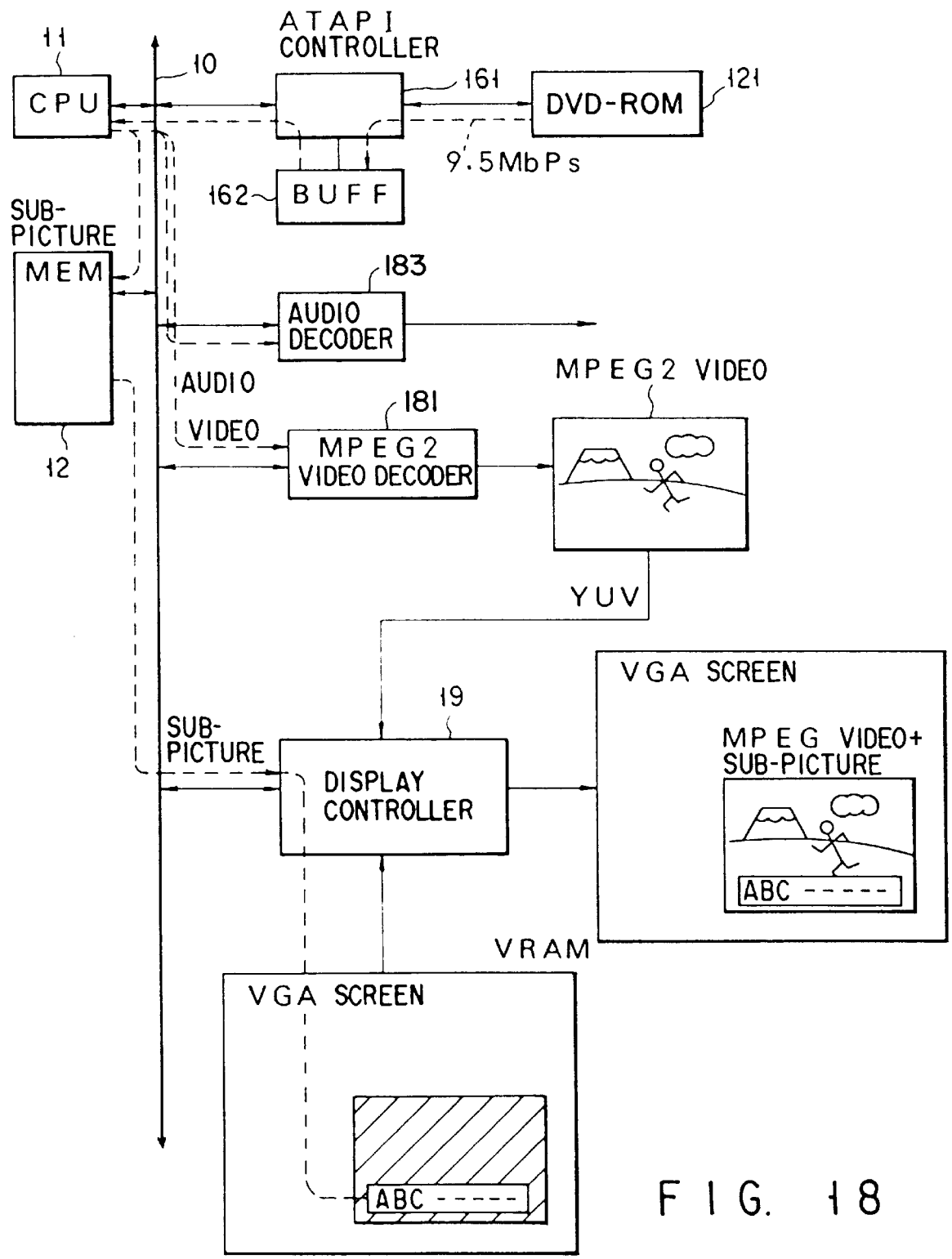
F I G. 18

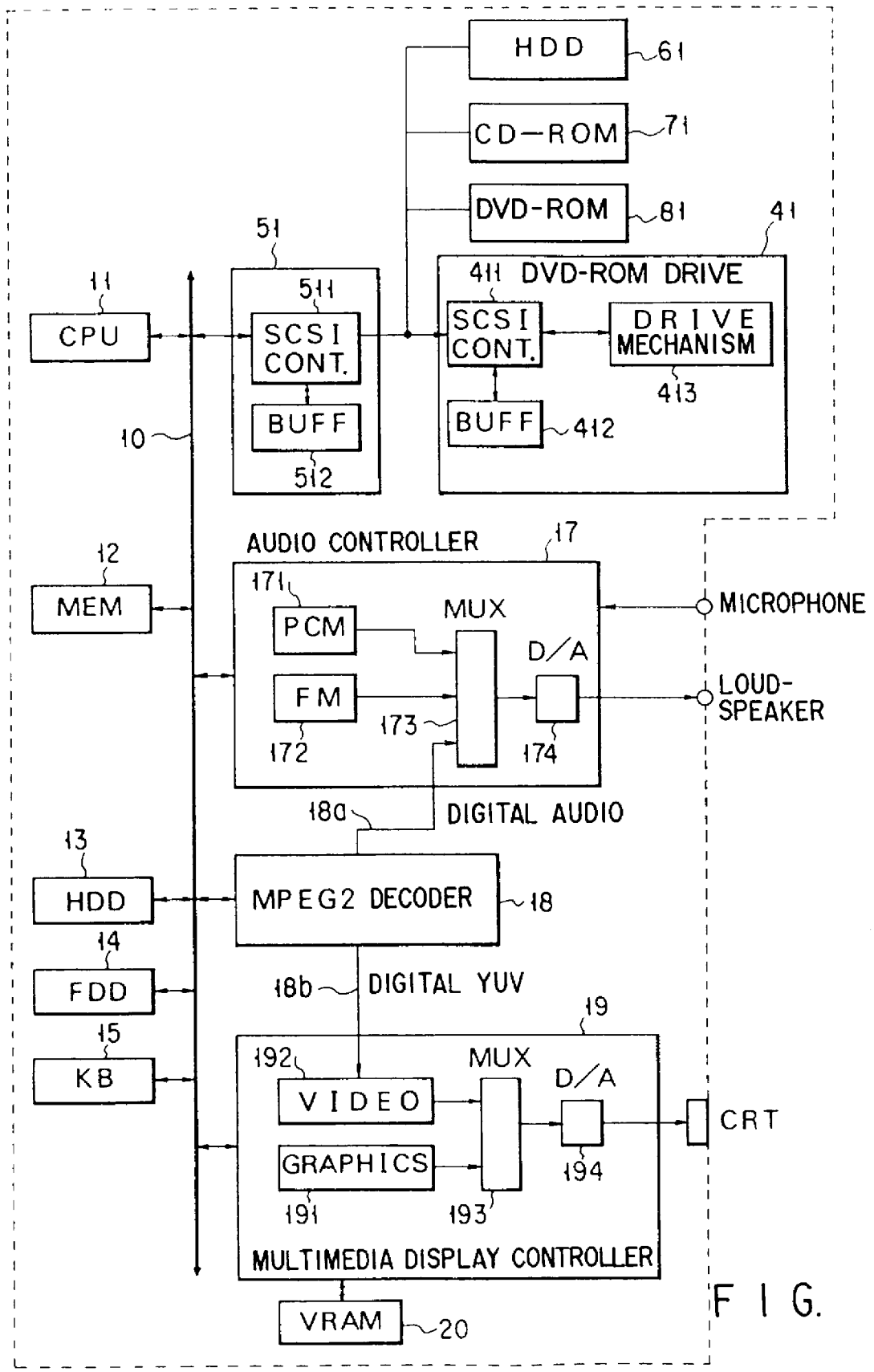
F I G. 21

MULTIMEDIA COMPUTER SYSTEM

This application claims benefit of international application PCT/JP96/00111 filed Jan. 23, 1996.

TECHNICAL FIELD

The present invention relates to a computer system and, more particularly, to a multimedia computer system which uses a disk drive unit for driving a high-density recording medium in which full-motion video data including a main picture and a sub-picture and sound data are digitally compressed and recorded to perform full-motion video display or sound reproduction.

BACKGROUND ART

As computer technology progressed in recent years, so-called multimedia personal computers of various types have been developed. A personal computer of this type can reproduce not only text data and graphics data but also full-motion video data and sound data.

Normally, full-motion video data is compressed and coded using MPEG1 (Moving Picture Image Coding Experts Group Phase 1; image format (at 30 frames per second): 350 pixels×240 pixels or less; coded data rate: 1.5 Mbits per second or less; coded image: frame image; motion vector prediction method: interframe prediction) and stored in a CD-ROM or the like. To decode and display/reproduce the full-motion video data, dedicated expansion board is used. As an expansion board for decoding and displaying/ reproducing the full-motion video data, for example, "Reel Magic" available from Sigma Designs, Inc., U.S.A., is well known. This "Reel Magic" has a video decoding function complying with the MPEG1 standard. The decoded full-motion video data is synthesized with VGA graphics received from a video card through a feature connector, and is displayed.

However, MPEG1 is a standard based on an assumption that a CD-ROM having a data transfer rate of about 1.5 Mbps is used. For this reason, in processing full-motion video data including a large quantity of image information, e.g., a movie, the image quality is undesirably degraded.

Recently, therefore, storage media of a new generation having a data transfer rate several to ten-odd times that of a CD-ROM have been developed. As such a new-generation storage medium, a system capable of recording digital data in an information amount of about 10 GB in a single disk, and realizing a data transfer rate of about 10 Mbps at maximum has been proposed as a media player.

This media player records full-motion video data or sound data which is digitally compressed and coded on the basis of the MPEG2 (Moving Picture Image Coding Experts Group Phase 2; image format (at 30 frames per second): 720 pixels×480 pixels or less; coded data rate: 15 Mbit per second or less; coded image: frame image or field image; motion vector prediction method: interframe prediction or interfield prediction) standard in a disk medium such as an optical disk, decodes the full-motion video data with sound data, and outputs the data to a TV set.

This media player has a disk drive unit, a data buffer, a video decoder, an audio decoder, an NTSC encoder, and the like. In this media player, an optical disk is driven by the disk drive unit, so that the full-motion video data and the sound data are read from the optical disk and stored in the data buffer.

The full-motion video data and the sound data, which are stored in the data buffer, are decoded by the video decoder and the audio decoder, respectively. The full-motion video data decoded by the video decoder is converted into an NTSC signal by the NTSC encoder and sent to the video input terminal of the TV set. On the other hand, the sound data decoded by the audio decoder is D/A-converted and thereafter sent to the audio input terminal of the TV set.

The data transfer rate of this media player is as high as about 10 Mbps, as described above. For this reason, by using this media player, movie information including not only a main picture but also a sub-picture such as a subtitle and a plurality of sound channels can be recorded in a single disk with a size almost the same as that of a CD. In addition, the main picture, the sub-picture, and the sound can be synchronized and reproduced on a TV set.

However, when this media player is to be mounted in a personal computer, a video decoder and the like must be arranged in the system of the personal computer, independently of the media player.

This is because the video decoder in the media player is dedicated to the player, so the video decoder in the media player cannot be used to decode an MPEG title recorded in a medium other than that in the media player, e.g., a hard disk or a CD-ROM.

For this reason, when a system in which a media player is mounted in a personal computer is constructed, two video decoders for reproducing full-motion video data are provided in the system, resulting in an increase in cost of the entire system.

It is an object of the present invention to provide a computer system capable of realizing an optimum system for reproducing large-capacity multimedia information including a main picture, a sub-picture, and sound data on a personal computer, thereby performing inexpensive and high-quality full-motion video reproduction without providing two video decoders for reproducing the full-motion video data in the system.

It is another object of the present invention to provide a computer system capable of decoding and reproducing large-capacity multimedia information including a main picture, a sub-picture, and sound data with a simple hardware configuration.

DISCLOSURE OF INVENTION

According to the first aspect of the present invention, there is provided a computer system comprising a disk drive unit for driving a recording medium in which digitally compressed and coded full-motion video data with a sub-picture is recorded, a system bus, a display monitor, a video decoder connected to the system bus to decode the full-motion video data included in a digital data stream read out from the disk drive unit, a sub-video decoder connected to the system bus to decode the sub-picture data included in the digital data stream read out from the disk drive unit, and a display controller connected to the system bus to receive the decoded full-motion video and the decoded sub-picture and display the full-motion video data with the sub-picture on a screen of the display monitor.

The disk drive unit used in this computer system is not constituted by the entire media player, as described above, but by only a portion corresponding to the disk drive unit of the media player. Full-motion video data including a large quantity of main pictures, sub-pictures, and sound data are coded by high-efficiency digital compression coding such as the MPEG2 standard and stored in the recording medium of the disk drive unit.

The coded full-motion video data and sub-picture data read out from the disk drive unit are decoded by a video decoder and a sub-video decoder incorporated in the system, respectively.

As described above, in this system, unlike the prior art in which full-motion video data and a sub-picture are decoded in the media player, these data are decoded by the video decoder and the sub-video decoder incorporated in the system, respectively. The video decoder and the sub-video decoder are connected to a system bus. For this reason, these decoders can be used to decode not only coded data read out from the disk drive unit but also coded data read out from another recording medium such as a hard disk or CD-ROM.

The full-motion video data decoded by the video decoder is transferred to a display controller and displayed on a screen by the display controller. For this reason, no expansion board dedicated to full-motion video reproduction is needed, unlike the prior art.

Therefore, an optimum system for reproducing large-capacity multimedia information consisting of full-motion video data with a sub-picture and sound data on a personal computer can be realized. This enables high-quality full-motion video reproduction without providing two video decoders for full-motion video reproduction in the system or using any expansion board dedicated for full-motion video reproduction.

The disk drive unit is preferably connected to the computer system through a peripheral interface unit such as an ATAPI (AT Attachment Packet Interface) interface or a SCSI (Small Computer System Interface) interface having a data buffer. The ATAPI is a protocol which is an industrial standard which maintains a compatibility at register level with the existing IDE (Integrated Device Electronics) interface (an interface developed by Western Digital Corp., U.S.A., in 1986 to connect a hard disk device to the ISA (Industrial Standard Architecture) bus used in IBM PC AT compatible machines; the ANSI (American National Standards Institute), U.S.A. has standardized it as ATA (AT Attachment)). The latest version of the ATAPI is "ATA Packet Interface for CD-ROMs Revision 1.2", (SFF-8020), which has been established by personal computer makers, peripheral equipment makers, and OS makers belonging to the organization of external memory device industry of America, SFF (Small Form Factor) Committee (involving standardization of physical specifications of hard disk devices or physical/electrical specifications of external storage device interfaces) in February, 1994.

If full-motion video data coded at a variable rate using MPEG2 is stored in the recording medium of the disk drive unit, the transfer rate of an MPEG data bit stream read out from the disk drive unit is changeable. To cope with this variable transfer rate, a data buffer must be used to transfer full-motion video data from the disk drive unit to the video decoder. The data buffer is incorporated in the above-mentioned media player. When the disk drive unit is connected to the computer system through a peripheral interface unit having a data buffer, the data buffer in the peripheral interface unit can be used to transfer full-motion video data from the disk drive unit to the video decoder at a variable rate.

Therefore, not only the decoder but also the data buffer can be eliminated from the disk drive unit, so that a more inexpensive system can be realized.

When full-motion video reproduction is to be realized on a laptop or notebook personal computer, the video decoder and the audio decoder are preferably realized using cards such as PC cards. In this case as well, only by mounting cards, these decoders can be used to decode coded data read out from another recording medium such as a hard disk, as in a case wherein a video decoder and an audio decoder are connected to the bus.

According to the second aspect of the present invention, there is provided a computer system comprising a disk drive unit for driving a recording medium in which digitally compressed and coded full-motion video data with a sub-picture is recorded, a CPU, a system bus, a display monitor, a video decoder coupled to the system bus to decode full-motion video data, a display controller connected to the bus to synthesize the full-motion video data decoded by the video decoder on graphics drawn in a video memory and display the full-motion video data on the screen of the display monitor, means for causing the CPU to decode the sub-picture data included in the digital data stream read out from the disk drive unit, and means for causing the CPU to draw the decoded sub-picture in the video memory so that the full-motion video data with the sub-picture is displayed on the screen by the display controller.

The full-motion video data read out from the disk drive unit is decoded by the video decoder incorporated in the system while the sub-picture is decoded by software processing by the CPU. In this case, the decoded sub-picture is drawn in the video memory as in normal VGA graphics. The sub-picture drawn in the video memory is synthesized with the full-motion video data by the display controller and displayed on the screen.

As described above, since the sub-picture data is decoded and drawn in the video memory by software processing by the CPU, no logic for decoding the sub-picture is needed, so that the hardware configuration can be simplified.

BRIEF DESCRIPTION OF DRAWINGS

FIG. 1 is a block diagram showing the system configuration of a multimedia PC according to the first embodiment of the present invention;

FIG. 2 is a block diagram showing the arrangement of a DVD-ROM drive used in the system of the first embodiment;

FIG. 4 is a block diagram showing a detailed arrangement of an MPEG2 decoder arranged in the system of the first embodiment;

FIG. 7 is a detailed block diagram of the MPEG2 decoder shown in FIG. 4;

FIG. 9 is a block diagram showing the details of a RAM 184 shown in FIG. 4;

FIG. 16 is a block diagram showing a detailed arrangement of an MPEG2 decoder arranged in the system of the third embodiment;

FIG. 18 is a view for explaining the data flow of full-motion video reproduction in the system of the third embodiment;

FIG. 21 is a block diagram for explaining the second modification of the first to fourth embodiments shown in FIGS. 1, 12, 15, and 19.

BEST MODE OF CARRYING OUT THE INVENTION

Figure 3:
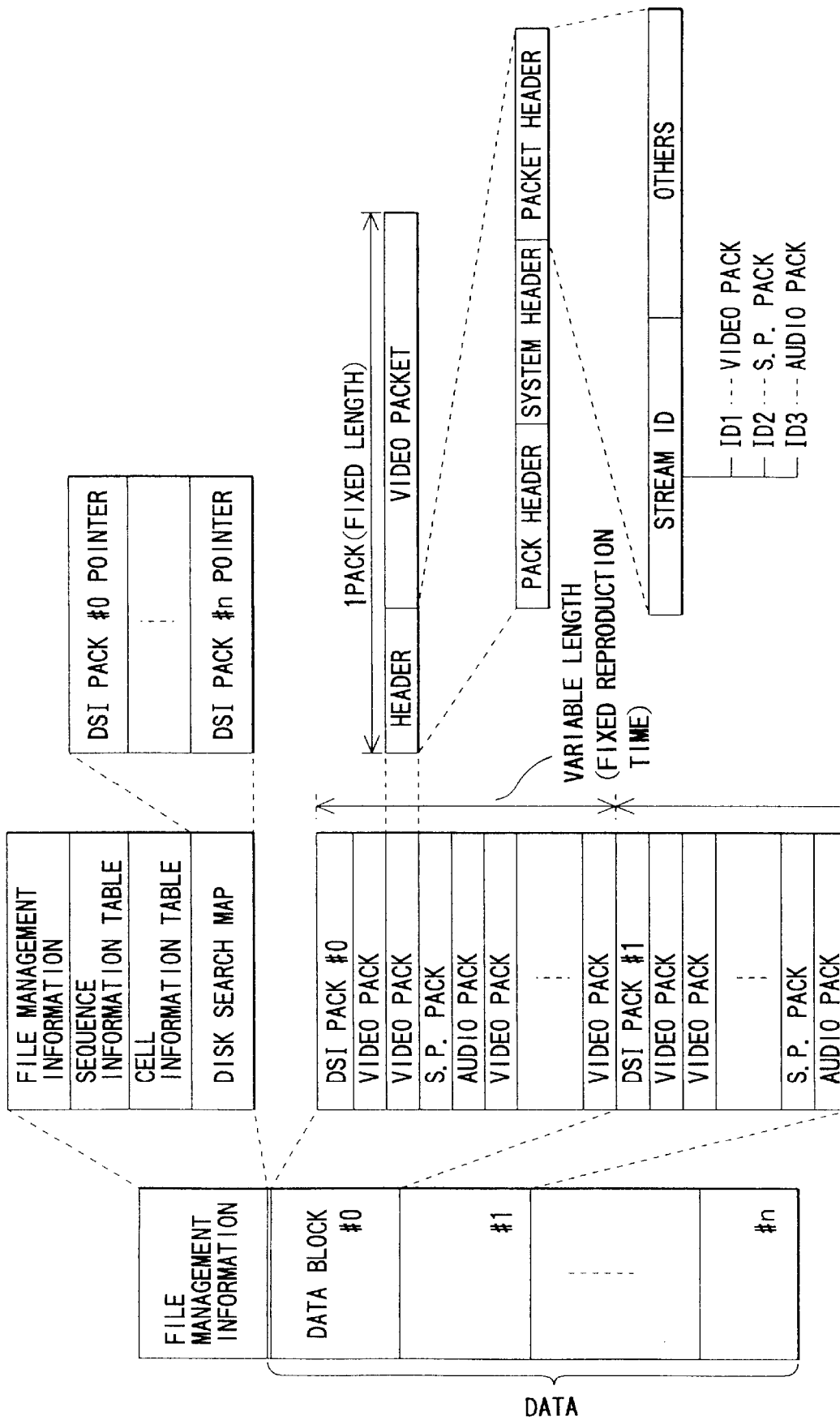
FIG. 3 is a view showing a full-motion video data recording format used in the system of the first embodiment.

The embodiments of the present invention will be described below with reference to the accompanying drawings.

FIG. 1 shows the system configuration of a personal computer according to an embodiment of the present invention. This system corresponds to a desktop personal computer and has a system bus 10, a CPU 11, a system memory (MEM) 12, an HDD 13, an FDD 14, a keyboard (KB) 15, an ATAPI interface 16, an audio controller 17, an MPEG2 decoder 18, a multimedia display controller 19, and a video memory (VRAM) 20, as shown in FIG. 1. A DVD-ROM drive 21 storing full-motion video data coded using MPEG2 is connected to the ATAPI interface 16.

The DVD-ROM (Digital Video Disk ROM) drive 21 corresponds to the disk drive unit of the above-mentioned media player, which has a memory capacity of about 10 GB on both sides of the disk and a data transfer rate of about 10 Mbps at maximum. That is, this DVD-ROM is a ROM based on the DVD standard. The DVD standard is as follows:

recording method: phase change recording disk diameter: 120 mm substrate thickness: 0.6 mm (two 0.6-mm thick substrates are bonded to each other)

recording capacity: 2.6 Gbytes or more on one side (5.2 Gbytes or more on both sides)

sector size: 2 Kbytes (error correction is performed in units of clusters each consisting of 16 sectors; write/read access is performed in units of clusters.

rotation control method: ZCLV (zone constant linear velocity)

wavelength of light source: 650 nm or 680 nm

NA (numerical aperture) of objective lens: 0.6 track pitch: 0.74 μm track recording density: about 0.41 μm/bit maximum continuous data transfer rate: 10 Mbits per second or more As shown in FIG. 2, the DVD-ROM drive 21 comprises an optical disk 211, a motor 212, a pickup 213, a pickup drive 214, a servo controller 215, and a drive controller 216 including an ECC circuit for error detection/correction. The motor 212, the pickup 213, the pickup drive 214, the servo controller 215, and the drive controller 216 function as a drive unit for driving the optical disk 211 to read out data recorded in the optical disk 211.

A movie of, e.g., about 135 minutes can be recorded on one side of the optical disk 211. This movie information can include a main picture (video), a sub-picture of up to 16 channels, and sound (audio) data of up to 8 channels.

In this case, the video, sub-picture, and audio are digitally coded on the basis of the DVD standard and recorded. According to the MPEG2 standard, not only MPEG2 video data coded using MPEG2 but also another coded data can also be included. These coded data are processed as one MPEG bit stream (digital data stream).

Therefore, in this embodiment, MPEG2 is used to code video, and run length coding and DOLBY AC3 are used to code a sub-picture and audio, respectively. In this case as well, the coded video, sub-picture, and audio are processed as one MPEG bit stream.

MPEG2 coding processing based on the DVD standard is variable rate coding so that the data transfer rate can be changed. For this reason, as for video data, the information amount recorded/reproduced in unit time can be changed. For a scene with a quick motion, the transfer rate of an MPEG bit stream constituting a frame group corresponding to that scene is increased. This processing enables high-quality full-motion video reproduction.

In this embodiment, to utilize the feature of MPEG2, a data format as shown in FIG. 3 is used to record movie information in the optical disk 211.

As shown in FIG. 3, movie information is formed of a file management information portion and a data portion. The data portion includes a large number of data blocks (blocks #0 to #n). A DSI (Disk Search Information) pack is placed at the start of each data block, so a segment from one DSI pack to the next DSI pack constitutes one data block. The memory position of each DSI pack is managed using the disk search map information of the file management information portion.

One data block constitutes information corresponding to 15 frames necessary for reproducing full-motion video for a predetermined time period of, e.g., 0.5 second and corresponds to a GOP (Group of picture). Video packs (VIDEO packs), sub-picture packs (S.P packs), and audio packs (AUDIO packs) are multiplexed and recorded in each data block. The video pack (VIDEO pack), the sub-picture pack (S.P pack), and the audio pack (AUDIO pack) are the data units of the coded video, sub-picture, and audio, respectively. The data size of each pack is fixed although the number of packs included in one data block is changeable. Therefore, a data block corresponding to a scene with a quick motion includes a large number of video packs.

Each of the video packs, the sub-picture packs, and the audio packs is formed of a header portion and a packet portion (a video packet, a sub-picture packet, or an audio packet). The packet portion corresponds to coded data itself. The header portion is constituted by a pack header, a system header, and a packet header. A stream ID representing that the corresponding packet is a video packet, a sub-picture packet, or an audio packet is registered at the packet header.

Each unit of the system in FIG. 1 will be described below.

The CPU 11 controls the operation of the entire system and executes an operating system and an application program as an execution target, which are stored in the system memory (MEM) 12. Reproduction of a movie recorded in the DVD-ROM drive 21 is executed by causing the CPU 11 to execute a full-motion video reproducing driver.

The ATAPI interface 16 is a peripheral interface for connecting the peripheral devices such as an HDD or a CD-ROM to the system bus 10, and in this embodiment, performs data transfer between the DVD-ROM drive 21 and the MPEG2 decoder 18. As shown in FIG. 1, the ATAPI interface 16 has an ATAPI controller (SCSI CONT) 161 and a data buffer (BUFF) 162. The ATAPI controller 161 controls data transfer with respect to the DVD-ROM drive 21 in accordance with a command from the CPU 11. The data buffer (BUFF) 162 is used to change the data transfer rate with respect to the host system. An MPEG stream including video, a sub-picture, and audio and read out from the DVD-ROM drive 21 is transferred to the MPEG2 decoder 18 through the data buffer (BUFF) 162.

In this case, the data transfer rate from the DVD-ROM drive 21 to the ATAPI interface 16 is the highest data transfer rate of the DVD-ROM drive 21, e.g., 9.5 Mbps.

On the other hand, the data transfer rate from the data buffer 162 to the MPEG2 decoder 18 is changeable. The average transfer rate increases when a data block with a large information amount is transferred. This is because data transfer from the data buffer 162 to the MPEG2 decoder 18 is performed under the control of the CPU 11 in synchronism with the decoding processing operation of the MPEG2 decoder 18, and for a data block with a large information amount, the data transfer cycles executed for a predetermined time increase.

The audio controller 17 performs input/output control of sound data under the control of the CPU 11 and has a PCM sound source 171, an FM sound source 172, a multiplexer 173, and a D/A converter 174 to output sound data. The multiplexer 173 receives outputs from the PCM sound source 171 and the FM sound source 172, and digital audio data transferred from the MPEG2 decoder 18, and one of these data is selected.

The digital audio data is audio data which is read out from the DVD-ROM drive 21 and decoded. To transfer the digital audio data from the MPEG2 decoder 18 to the audio controller 17, an audio bus 18a is used instead of the system bus 10. This enables high-speed transfer of digital audio data.

The MPEG2 decoder 18 receives an MPEG bit stream transferred from the DVD-ROM drive 21 through the data buffer 162 of the ATAPI interface 16 under the control of the CPU 11, separates the MPEG bit stream into video, sub-picture, and audio packets, decodes the packets, and output the packets in synchronism with each other.

The decoded audio data is transferred to the audio controller 17 through the audio bus 18a as digital audio data, as described above. The decoded video and sub-picture are synthesized and sent to the multimedia display controller 19 as digital YUV data. In this case, to transfer the digital YUV data from the MPEG2 decoder 18 to the multimedia display controller 19, a video bus 18b is used instead of the system bus 10. Therefore, transfer of digital YUV data can also be performed at a high speed, like digital audio data.

As the video bus 18b, a VAFC (VESA Advanced Feature Connector) or VM-Channel (VESA Media Channel) based on the VESA standard can be used.

The multimedia display controller 19 controls a CRT display used as a display monitor in this system under the control of the CPU 11 and supports not only display of text and graphics data of VGA specifications but also display of full-motion video.

As shown in FIG. 1, the multimedia display controller 19 has a graphics display control circuit (Graphics) 191, a video display control circuit 192, a multiplexer 193, a D/A converter 194, and the like.

The graphics display control circuit 191 is a VGA-compatible graphics controller, which converts VGA graphics data drawn in the video memory (VRAM) 20 into RGB video data and outputs the video data. The video display control circuit 192 has a video buffer for storing digital YUV data, a YUV-RGB conversion circuit for converting the YUV data stored in the buffer into RGB video data, and the like.

The multiplexer 193 selects one of output data from the graphics display control circuit 191 and the video display control circuit 192 or synthesizes a video output from the video display control circuit 192 on VGA graphics from the graphics display control circuit 191 and sends the data to the D/A converter 194. The D/A converter 194 converts video data from the multiplexer 193 into analog R, G, and B signals and outputs the signals to the CRT display.

FIG. 4 shows the detailed arrangement of the MPEG2 decoder 18.

The MPEG2 decoder 18 has three decoders corresponding to video, a sub-picture, and audio, i.e., an MPEG2 video decoder 181, a sub-picture decoder 182, and an audio decoder 183 to decode/reproduce the bit stream of multiplexed video, sub-picture, and audio in synchronism with each other.

The MPEG2 video decoder 181, the sub-picture decoder 182, and the audio decoder 183 are coupled to the system bus 10 through internal buses. The MPEG2 video decoder 181 and the sub-picture decoder 182 respectively have RAMs 184 and 185 used for decoding processing and the like.

The MPEG2 video decoder 181 is used to decode video data included in a multiplexed MPEG stream and repeatedly issues a transfer request until an MPEG stream corresponding to, e.g., one data block is received from the ATAPI interface 16. The MPEG2 video decoder 181 uses the stream ID described in FIG. 3 to separate the received MPEG stream into video packs, sub-picture packs, and audio packs and decodes the video packs. The sub-picture and audio packs separated by the MPEG2 video decoder 181 are sent to the sub-picture decoder 182 and the audio decoder 183, respectively.

As described above, the decoding/reproducing time corresponding to one data block is fixed while the information amount included in one data block is variable. Therefore, the number of transfer requests generated until the MPEG2 video decoder 181 receives an MPEG stream corresponding to one data block increases as the information amount of the data block increases, so that the average transfer rate of the MPEG stream increases.

The sub-picture decoder 182 decodes the sub-picture packs separated by the MPEG2 video decoder 181. Decoding processing executed at this time corresponds to coding processing which has been performed for the sub-picture data, i.e., run length coding. Subsequently, the sub-picture decoder 182 receives video data decoded by the MPEG2 video decoder 181 and synthesizes the video data with the sub-picture decoded by the sub-picture decoder 182. The synthesis position of the sub-picture is determined by position information included in the header portion added to the sub-picture packet. The synthesized data is output as digital YUV data.

Figure 5:
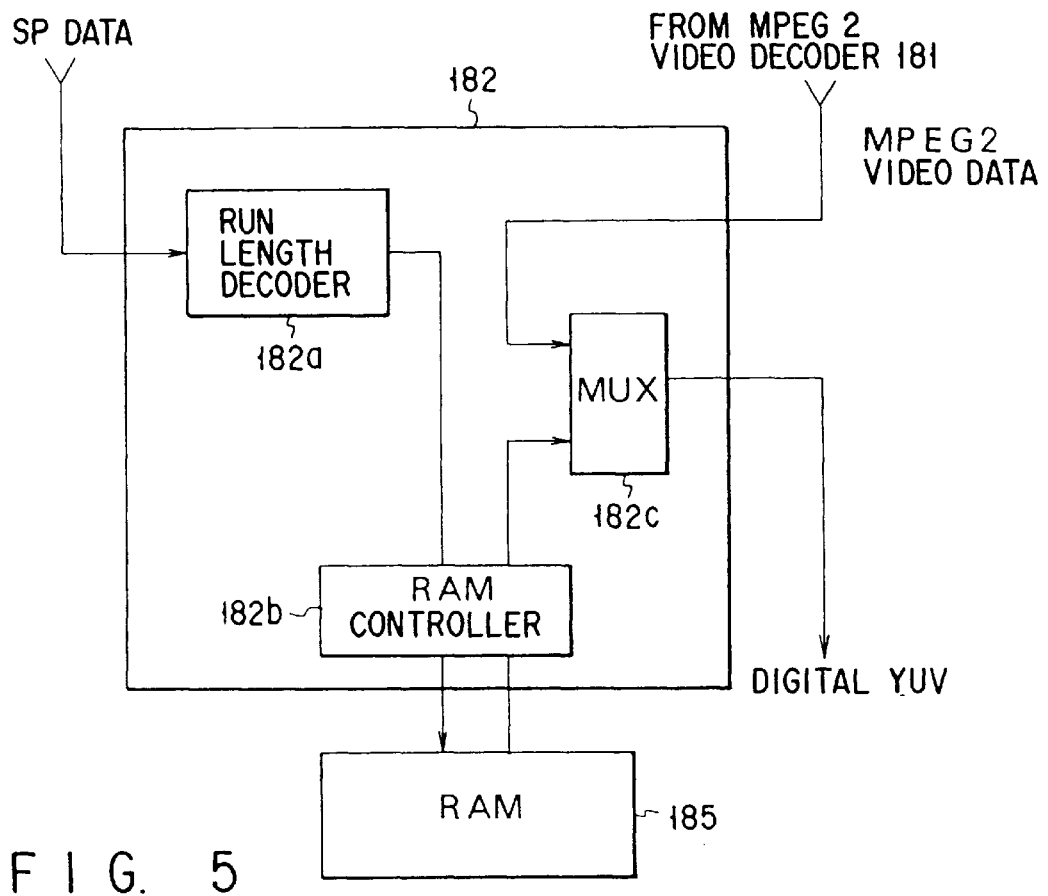
FIG. 5 is a detailed block diagram of a sub-picture decoder shown in FIG. 4.

FIG. 5 is a detailed block diagram of the sub-picture decoder 182 shown in FIG. 4. As shown in FIG. 5, the sub-picture decoder 182 comprises a run length decoder 182a for decoding sub-picture data (SP data) supplied from the MPEG2 video decoder 181, a RAM controller 182b for performing control to store the decoded sub-picture in the RAM 185, and a multiplexer 182c for synthesizing the decoded sub-picture which is read out from the RAM 185 through the RAM controller 182b with MPEG2 video data supplied from the MPEG2 video decoder 181.

Referring back to FIG. 4, the audio decoder 183 decodes audio packs separated by the MPEG2 video decoder 181. Decoding processing executed at this time corresponds to coding processing which has been performed for audio data, i.e., DOLBY AC3. The decoded audio packet is output as audio data.

Figure 6:
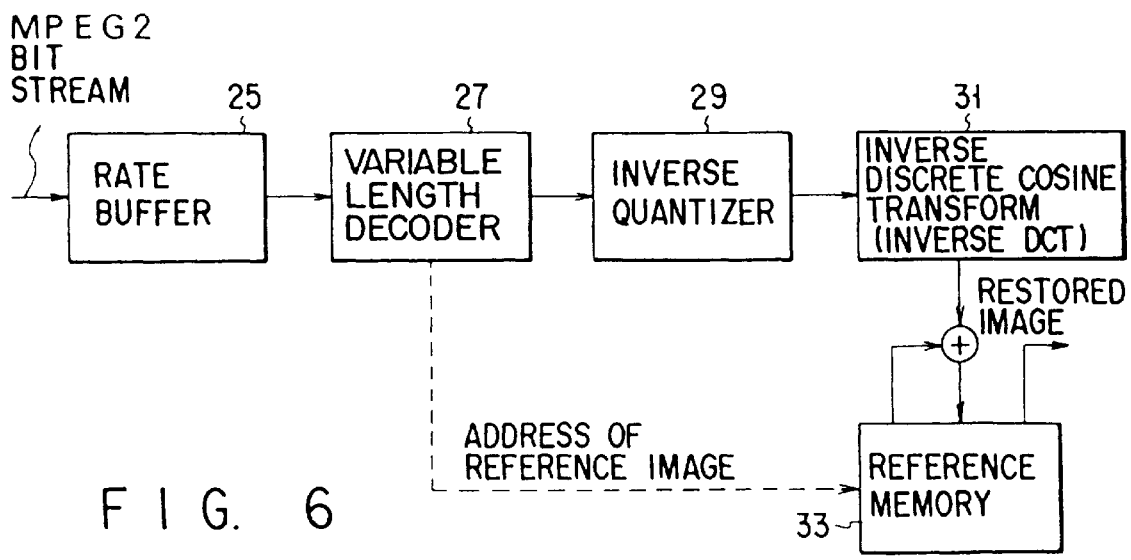
FIG. 6 is a block diagram showing the flow of decoding processing of an MPEG2 signal.

FIG. 6 shows the flow of decoding processing of an MPEG2 signal.

An MPEG2 bit stream signal is written in a rate buffer 25 serving as a buffer for rate adjustment. After the signal is read out, decoding is started. This is because a difference in code amounts necessary in a unit time in decoding must be compensated although the transfer rate is almost constant. For example, a frame which is coded only in the frame has a code amount per frame much larger than that of a frame which is coded using motion compensation from the preceding and subsequent frames.

The bit stream read out from the rate buffer 25 is interpreted in accordance with the MPEG2 grammar and decoded by a variable length decoder (VLD) 27. Thereafter, processing inverse to coding processing is performed by an inverse quantizer 29, i.e., inverse quantization is performed by multiplying a quantization table. In addition, inverse discrete cosine transform (inverse DCT) as transform processing for returning a frequency space to a real space is performed, thereby restoring an image.

On the other hand, for a motion-compensated picture, a motion vector, which is interpreted from the bit stream and reconstructed, is used to calculate the address of a reference image (a frame/field which is already restored and serves as a reference for restoring a new frame/field). A reference image read out from a reference memory in accordance with this address is added to the result of the above-described inverse DCT, thereby performing motion compensation. For an image decoded in this manner, frames in an inverted order (to enable motion compensation from the future, later images are sent early in the transfer order) are rearranged along the time axis, thereby ending MPEG2 decoding processing.

FIG. 7 is a detailed block diagram of the MPEG2 video decoder 181 for decoding an MPEG2 signal which is coded on the basis of MP@ML (Main Profile at Main Level: "Profile" defines the complexity of a compression algorithm used for coding, and "Level" defines the resolution of a coded image) in real time.

Referring to FIG. 7, a variable length decoder (VLD) 35 is controlled by an incorporated 32-bit RISC (reduced instruction set computer) 37. The RISC 37 is operated by software stored in an IMEM (instruction memory) of 2K word. The VLD 35 is a dedicated circuit including a circuit with a partial macro-cell. With the cooperation of the programmable RISC and the VLD as a dedicated circuit, a bit stream syntax (the grammar for a bit stream structure, which consists of a sequence header and layers in MPEG2) is interpreted while coded data is decoded at a high speed, thereby determining the operation of the chip.

Figure 8:
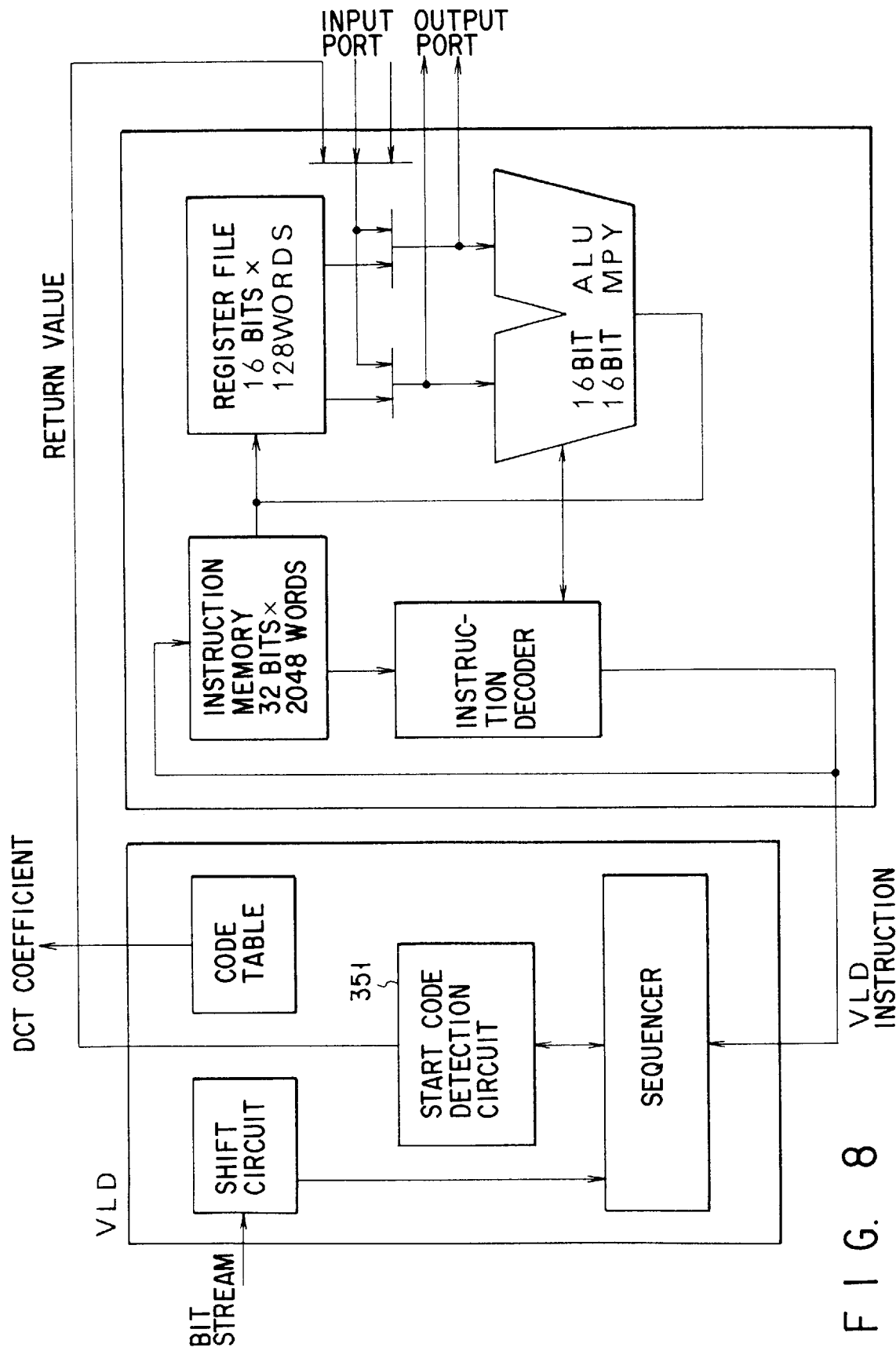
FIG. 8 is a detailed block diagram of a RISC and a VLD shown in FIG. 7.

FIG. 8 shows a detailed block diagram of the RISC 37 and the VLD 35. Actual bit stream interpretation is performed in the following manner.

First, as for interpretation of a variable-length code other than a DCT coefficient and the fixed-length code of a header portion, the RISC 37 controls the VLD 35 in units of symbols. RISC instruction sets are as follows:
Jump instruction Halt
Unconditional jump
Conditional jump
Unconditional call
Conditional call
Unconditional return
Conditional return
Interrupt return
Move instruction
   Register immediate value
Arithmetic instruction
   NOP
   A+B
   A+B+Carry
   A+B+1
   A−B
   A−B−Borrow
   Arithmetic right shift
   Logical right shift
   Logical left shift
   AND
   OR
   Exclusive-OR
   Comparison
   A×B
   Multicomparison
VLD instruction
   Decoding of fixed-length code
   Byte align
   Decoding of variable-length code
   Continuous decoding of quantization matrix
   Continuous decoding of DCT coefficient
   Control of the VLD 35 is executed in the following manner when the RISC 37 issues a VLD instruction to the VLD, and a return value is received from the RISC 37.

When decoding of the VLD 35 is started, a start code detection circuit 351 in the VLD 35 detects a start code from the bit stream, and returns the detected start code to the RISC 37 as a return value. The RISC 37 determines the next processing on the basis of the type of the decoded and returned start code. If a fixed-length code follows the start code on the syntax, an instruction for decoding the fixed-length code is issued to the VLD 35 while using the length of the code as an argument. If a variable-length code follows the start code, an instruction for decoding the variable-length code is issued to the VLD 35.

The VLD 35 interprets the instruction, performs an operation according to the instruction, and returns the decoded code to the RISC 37 as a return value. At the same time, the start of the next code is detected. The RISC 37 determines the next processing in accordance with the return value. Various parameters which are translated by calculating this return value are temporarily stored in a register file or transferred to the subsequent arithmetic block.

On the other hand, decoding of a portion where fixed-length codes or variable-length codes continue, e.g., the quantization matrix portion or the DCT coefficient portion corresponding to actual image data is performed in accordance with a continuous code decoding instruction.

At the DCT coefficient portion of the bit stream, the RISC 37 issues a DCT coefficient continuous decoding instruction to the VLD 35. Upon reception of the DCT coefficient continuous decoding instruction, the VLD 35 decodes the consecutive DCT coefficients (variable-length codes) without intervention of the RISC 37. When an end code is detected, an interrupt is generated to the RISC 37.

On the other hand, after the DCT coefficient continuous decoding instruction is issued to the VLD, and while the VLD is executing decoding, the RISC 37 performs, (1) for a motion-compensated macro-block, reconstruction calculation of a motion vector by using parameters which are already interpreted at the header portion, or (2) for a macro-block which is coded only in a screen, DPCM (Differential Pulse Code Modulation: a prediction coding method in which a difference between the previous sample and the current sample is transferred as a binary code) decoding calculation of the DC (direct current) portion of the DCT coefficient. A parallel operation of the RISC and the VLD can be performed by the DPCM decoding arithmetic instruction. In the MPEG2, reconstruction calculation of four motion vectors must be performed at maximum with respect to one macro-block in some cases. Therefore, such a parallel operation is performed to efficiently use the arithmetic resource.

With the above operation and hardware, decoding of the DCT coefficient (variable-length code) which requires one symbol/cycle is realized by a high-speed dedicated circuit. On the other hand, interpretation of a bit stream, which requires flexibility, can be processed by program control. In addition, reconstruction calculation of a motion vector, which is processing with a relatively large calculation amount, is executed in parallel, thereby increasing the utilization efficiency of the hardware.

A run length decoder 36 in FIG. 7 decodes the length of the number of continuous zero coefficients (RUN).

An inverse quantization unit 39 in FIG. 7 performs processing of re-scaling the quantization coefficient before the quantization bit stream is decoded and supplied to the inverse DCT unit.

An inverse DCT circuit 43 in FIG. 7 is an inverse DCT circuit of 8 pixels×8 pixels, and butterfly calculation and the DA method Distributed Arithmetic: a method of performing product sum calculation of a constant coefficient and a variable. Instead of multiplication, a product sum result per one digit of the variable which has been calculated in advance is shifted/accumulated/added, thereby obtaining a multiplication result.

A motion compensation unit 45 uses motion vectors to perform processing for increasing the pixel value prediction efficiency. For prediction, an offset is given to the past and/or future reference picture including a decoded pixel value before a prediction error signal is formed using motion vectors. The motion vector is a two-dimensional vector used for motion compensation for giving an offset between the coordinate values of the current picture and those of the reference picture.

The RAM 184 shown in FIG. 4 is constituted as a 64-bit bus width by parallelly using four 4-Mbit DRAMs each consisting of 16 bits. Three memories are necessary for MPEG2 decoding, i.e., (1) a rate buffer which satisfies the capacity defined by MP@ML, (2) a reference picture 2 frame (corresponding to bidirectional prediction), and (3) a display buffer. In this embodiment, all of the memories (1) to (3) are arranged in the 16-Mbit capacity, thereby constituting a common memory bus using four 4-Mbit DRAMs, as shown in FIG. 9. In addition, a DRAM interface circuit such as a refresh control can be incorporated, and the DRAM can be directly connected and used without any accessory circuit. In place of the DRAM, a synchronous DRAM (which transfers an address or data in synchronism with the leading edge of a clocks may be used. The interior is divided into two banks, and data corresponding to one line address of a sense amplifier for each band, i.e., a total of two line addresses can be held. Since the held data is burst-transferred in synchronism with a clock, the transfer rate and the operation speed of the internal DRAM can be independently set) and an interface thereof may be used.

By connecting all memories necessary for decoding through a common memory bus, five read/write operations, i.e., (1) a rate buffer write operation, (2) a rate buffer read operation, (3) a reference image read operation, (4) a restored image write operation, and (5) a display image read operation are performed through one memory bus.

In addition to these read/write operations, (1) DRAM refresh, (2) a DRAM page selecting operation, (3) a read/write operation of unused data which is generated by a 64-bit (eight pixels) simultaneous read/write operation, and (4) a bank switching operation in use of a synchronous DRAM are added as overhead, so almost no margin is set for the necessary bandwidth. If internal processing stops due to the latency for the memory bus because of the short margin of the band width, the original processing capability for decoding may be decreased. To solve this problem, a bus arbiter for the memory bus and a plurality of FIFO memories connected to the memory bus are prepared in a chip, thereby avoiding data collision on the memory bus, and at the same time, avoiding a decrease in processing capability due to the latency for the memory bus.

Figure 10:
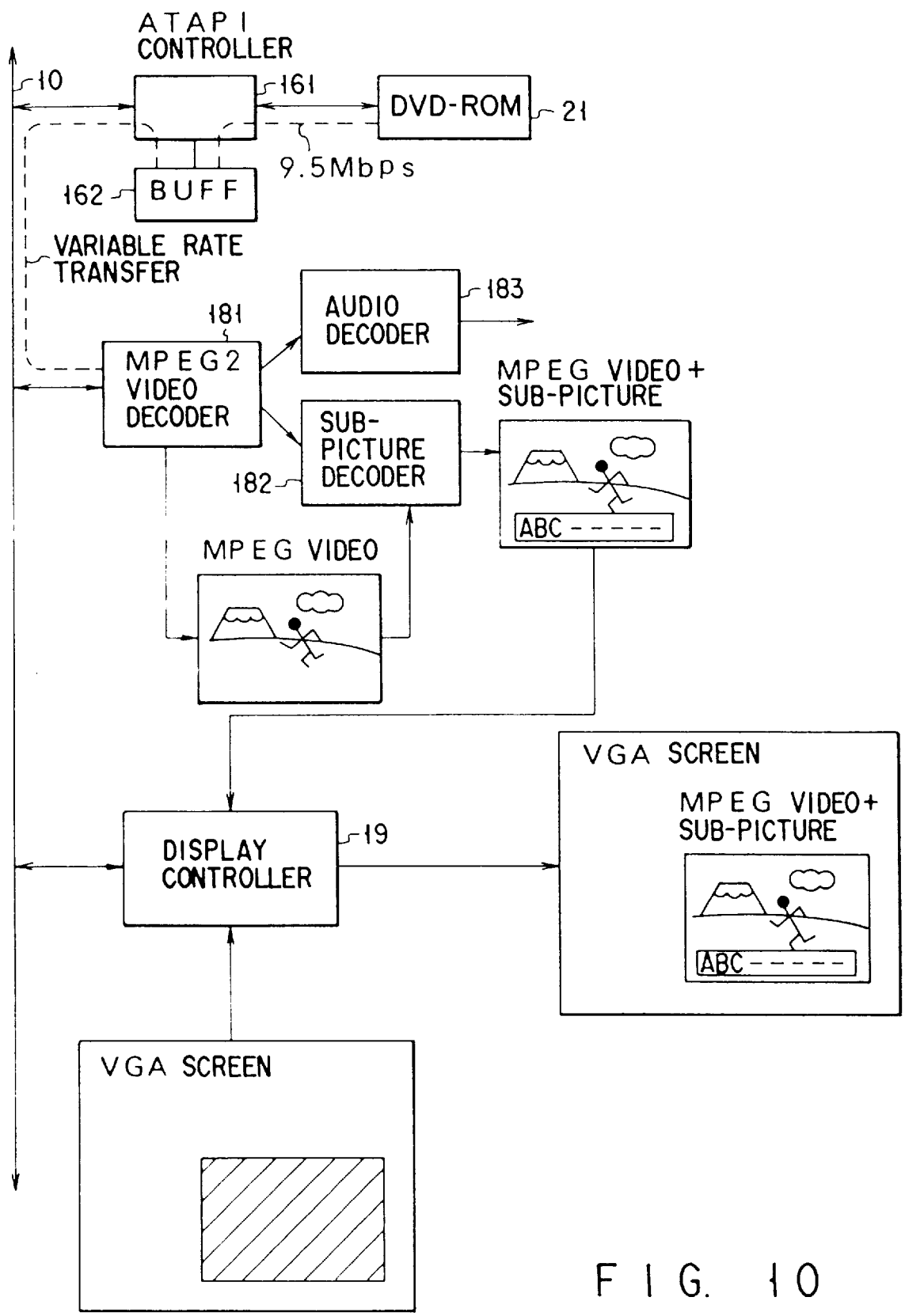
FIG. 10 is a view for explaining a full-motion video reproducing operation in the system of the first embodiment.

A movie reproducing operation in the system in FIG. 1 will be described below with reference to FIG. 10. When a transfer command is issued from the CPU 11, an MPEG stream is read out from the DVD-ROM drive 21 and transferred to the data buffer 162 of the ATAPI interface at a transfer rate of 9.5 Mbps. Subsequently, under the control of the CPU 11, transfer of the MPEG stream from the data buffer 162 to the MPEG2 video decoder 181 is started.

Figure 11:
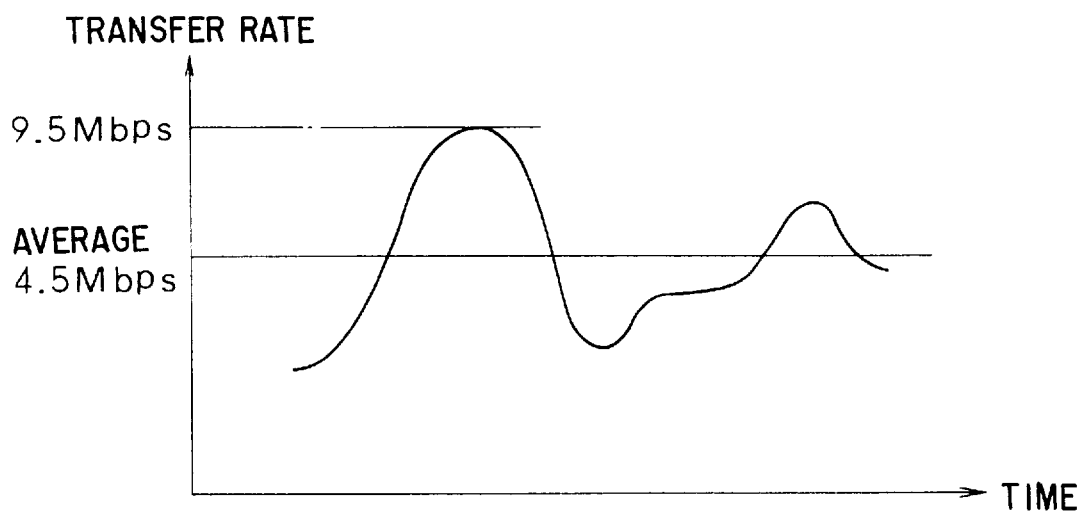
FIG. 11 is a chart showing a change in full-motion video data transfer rate in the system of the first embodiment.

The average transfer rate in this case is variable, as described above. As shown in FIG. 11, the transfer rate increases during a period A corresponding to a scene with a quick motion while the transfer rate decreases during a period B corresponding to a scene with a minimum motion.

MPEG video data is decoded by the MPEG2 video decoder 181 and restored to the original main picture data before coding. A sub-picture such as a subtitle is decoded by the sub-picture decoder 182, restored to a character pattern, and synthesized on the decoded MPEG video, as shown in FIG. 10. In addition, audio is decoded by the audio decoder 183 and reproduced.

The video data synthesized with the sub-picture is sent to the multimedia display controller 19 as digital YUV data and synthesized on a color key area (indicated as a hatched area) of VGA graphics.

In this manner, the main picture including the subtitle can be displayed on the VGA graphics, and the sound data can be reproduced in synchronism with the picture.

As described above, according to this embodiment, the DVD-ROM drive 21 consisting of only the drive unit of the above-described media player is used, and full-motion video data with a sub-picture and sound is recorded in the DVD-ROM drive 21. The DVD-ROM drive 21 is connected to the ATAPI interface 16. Using the data buffer 162 of the ATAPI interface 16, an MPEG stream is transferred to the MPEG2 decoder 18 on the system board at a variable rate.

Therefore, the arrangement necessary for full-motion video reproduction can be simplified, and at the same time, full-motion video data with a sub-picture and sound, which is coded using MPEG2, can be displayed at a high quality.

Figure 12:
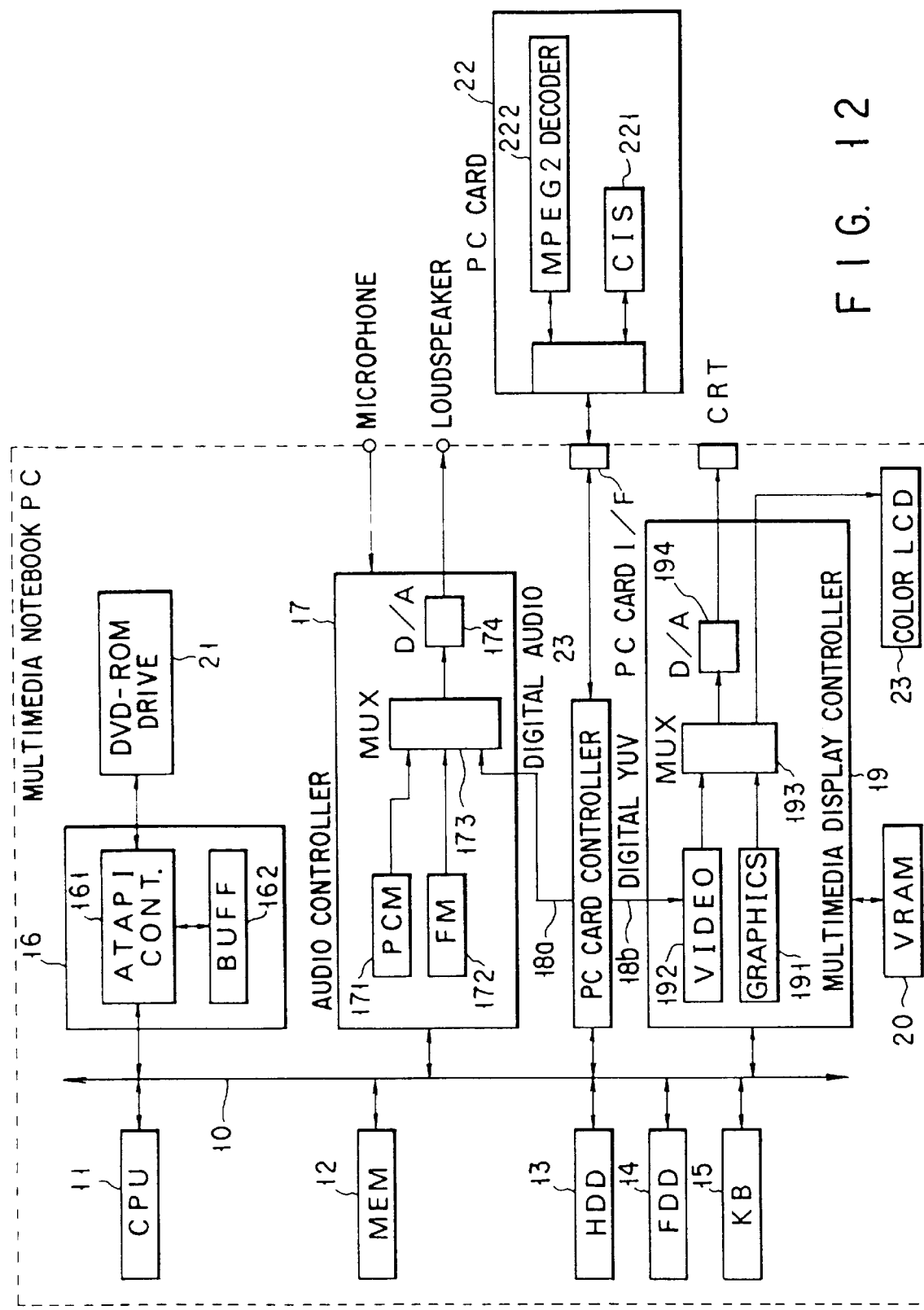
FIG. 12 is a block diagram showing the system configuration of a multimedia PC according to the second embodiment of the present invention.

A system configuration according to the second embodiment of the present invention will be described below with reference to FIG. 12. In the system of FIG. 12, the system configuration of the desktop personal computer system in FIG. 1 is applied to a notebook portable computer. The system in FIG. 12 differs from that in FIG. 1 only in the following point.

In this case, unlike FIG. 1, a MPEG2 video decoder 18 is realized not on a system board but on a PC card 22. At the same time, a PC card controller 23 has interfaces to an audio controller 17 and a multimedia display controller 19.

The PC card 22 complies with the PCMCIA specifications, which is mounted in the card slot of the notebook portable computer main body and connected to the PC card interface (connector) in the slot.

The PC card 22 has a CIS (Card Information Structure) 221 and an MPEG2 decoder 222. The MPEG2 decoder 222 has the same function as that of the MPEG2 video decoder 18 in FIG. 1 except the interfaces to the audio controller 17 and the multimedia display controller 19, and has the same arrangement as described in FIG. 4.

The PC card controller 23 controls various PC cards mounted in the PC card slots under the control of the CPU 11 and has two operation modes, i.e., mode 1 and mode 2. Mode 1 is a mode for controlling a normal PC card such as a modem card, in which data transfer is performed between a system bus 10 and the PC card, so an audio bus 18a and a video bus 18b are not used.

Mode 2 is a mode used when the PC card 22 is mounted in the PC card slot. In mode 2, the PC card controller 23 transfers an MPEG stream to the PC card 22, and at the same time, transfers digital audio data and digital YUV data, which are sent back from the PC card 22 through, e.g., different signal lines, to the audio controller 17 and the multimedia display controller 19 through the audio bus 18a and the video bus 18b, respectively.

Figure 13:
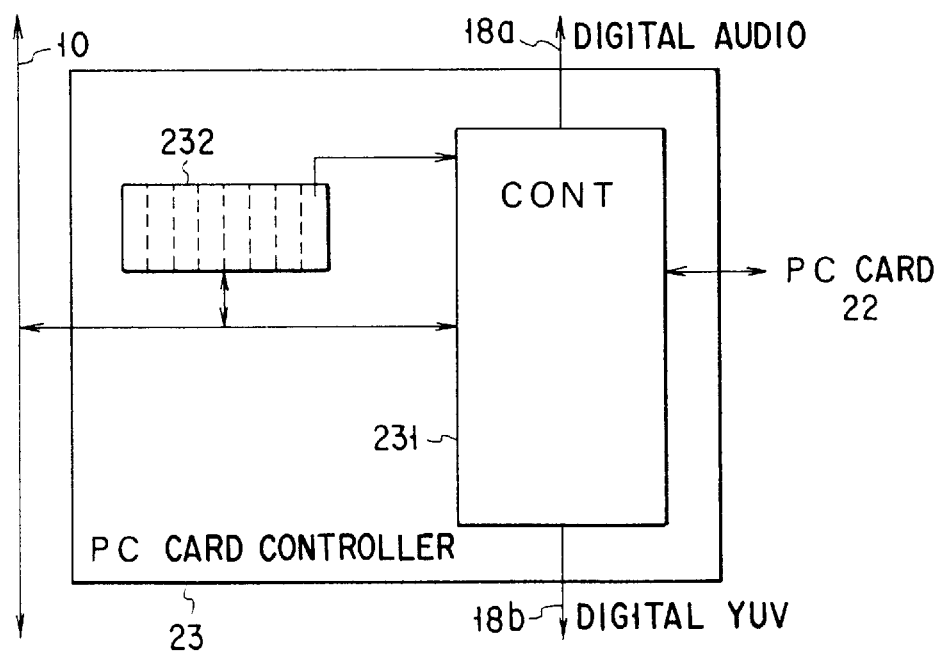
FIG. 13 is a block diagram showing the arrangement of a PC card controller provided in the system of the second embodiment.

FIG. 13 shows the arrangement of the PC card controller 23.

The PC card controller 23 has a data transfer control logic 231 and a mode register 232. When a mode designation flag is set in the mode register 232, the operation mode of the PC card controller 23 is switched.

The mode designation flag is set by the CPU 11 when the power supply of the system is turned on. More specifically, the CPU 11 reads attribute information from the PC card mounted in the PC card slot, thereby detecting the type of the mounted PC card in accordance with the attribute information. If the mounted PC card is the PC card 22, the CPU 11 sets a mode designation flag representing mode 2 in the mode register 232.

Figure 14:
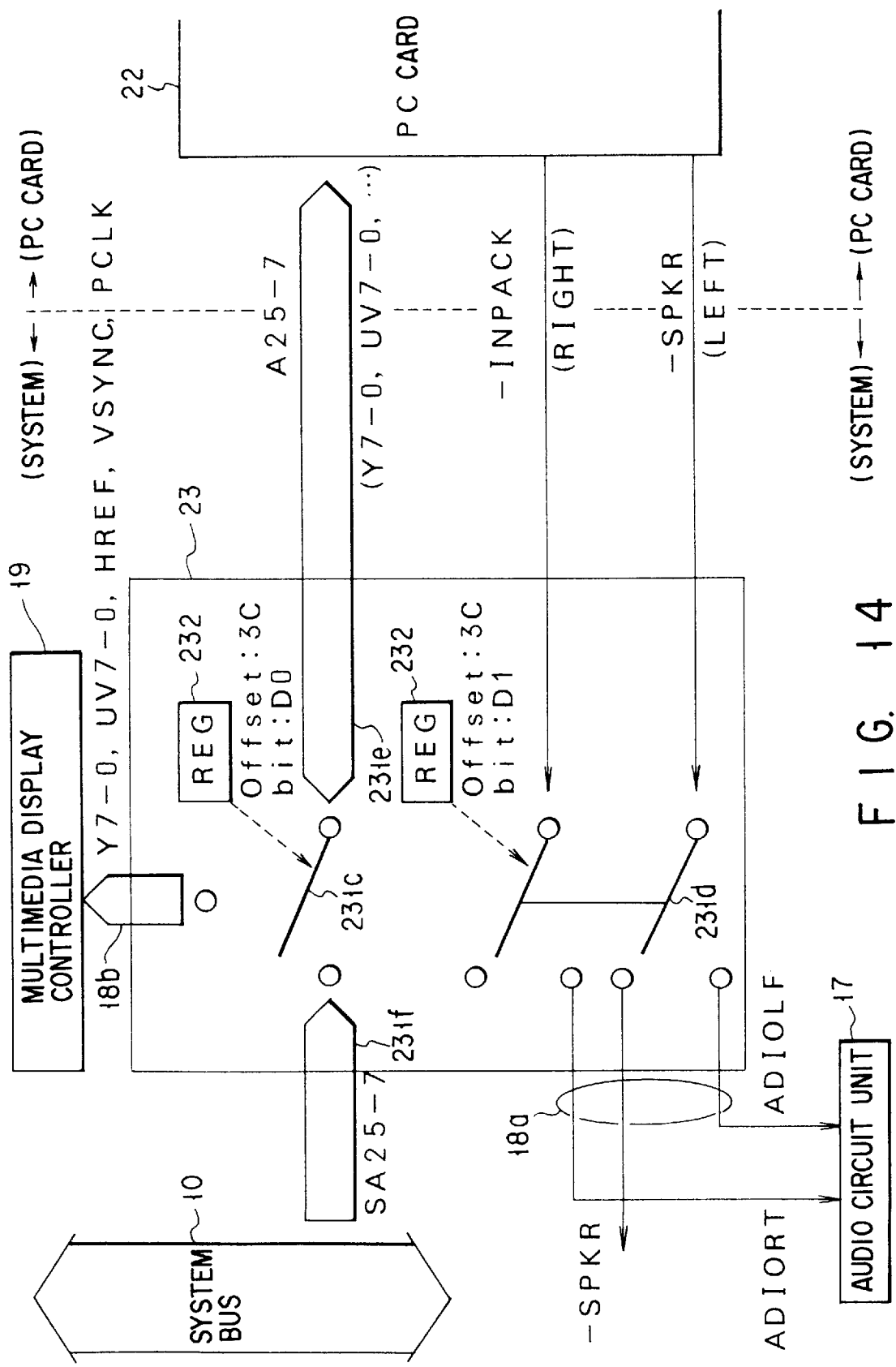
FIG. 14 is a detailed block diagram of a data transfer control logic 231 shown in FIG. 13.

FIG. 14 is a detailed circuit diagram of the PC card controller 23 shown in FIG. 13. As shown in FIG. 14, the PC card controller 23 has switch circuits 231c and 231d realized by, e.g., multiplexers. The switch 231c is set in mode 1 when bit 0 of the mode register 232 is "0". More specifically, the switch 231c connects a bus 231e to a bus 231f to perform data transfer between the system bus 10 and a normal PC card such as a modem card. When bit 0 of the register 23 is "1", mode 2 is set. More specifically, the switch 231d connects the bus 231e to the video bus 18b, so that eight luminance signal bits Y7–Y0, eight chrominance signal bits UV7–UV0, a horizontal sync signal HREF, a vertical sync signal VSYNC, and a pixel clock signal PCLK are supplied to the multimedia display controller 19.

When bit 0 of the control register is set to be "1", the switch 231d connects a terminal -SPKR (the 62nd pin of the I/O interface based on the PCMCIA standard, which serves as a digital audio signal terminal) and a terminal -INPACK (the 60th pin of the I/O interface based on the PCMCIA standard, which serves as an input response signal terminal) of the PC card 22 to the audio bus 18a. As a result, an audio left PWM (Pulse Wave Modulation) signal (ADIOLF) and an audio right PWM signal (ADIORT) are supplied from the terminals -SPKR and -INPACK to the audio controller 17 through the audio bus 18a, respectively.

The third embodiment of the present invention will be described below. In this embodiment, a sub-picture is decoded by software processing by a CPU.

Reproduction of a movie recorded in a DVD-ROM drive 21 is performed by causing a CPU 11 to execute an MPEG driver 121. The MPEG driver 121 includes a sub-picture decoding function.

The sub-picture decoding function of the MPEG driver 121 provides the following three functions.

(1) Disassembling of MPEG Bit Stream

The MPEG bit stream disassembling function separates an MPEG bit stream into video packs, sub-picture packs, and audio packs and transfers the video packs and the audio packs to an MPEG2 decoder 18. This separation processing is executed in units of packs on the basis of the stream ID in FIG. 3.

(2) Decoding of Sub-picture

The sub-picture decoding function decodes the separated sub-picture packs on a system memory 12.

(3) Transfer of Sub-picture to VGA

The function of transferring sub-picture data to a VGA transfers the decoded sub-picture data to a multimedia display controller 19 and draws the sub-picture data in a video memory (VRAM) 20.

In this embodiment as well, the data transfer rate from a data buffer 16 to the CPU 11 is variable. As the information amount of a data block to be transferred increases, the average transfer rate at that time increases. The decoded video data is sent to the multimedia display controller 19 as digital YUV data.

FIG. 16 shows the detailed arrangement of the MPEG2 decoder 18.

The MPEG2 decoder 18 has two decoders corresponding to video and audio, i.e., an MPEG2 video decoder 181 and an audio decoder 183 to perform decoding/reproduction so as to synchronize the bit streams of the video and audio data separated by the CPU 11.

The MPEG2 video decoder 181 and the audio decoder 183 are connected to a system bus 10. The MPEG2 video decoder 181 has a RAM 184 used for decoding processing and the like.

The MPEG2 video decoder 181 decodes video data transferred from the CPU 11 and outputs the video data as digital YUV data. The audio decoder 183 decodes audio data transferred from the CPU 11. Decoding processing executed at this time corresponds to coding processing which has been performed for the audio data, i.e., DOLBY AC3. The decoded audio data is output as digital audio data.

Figure 17:
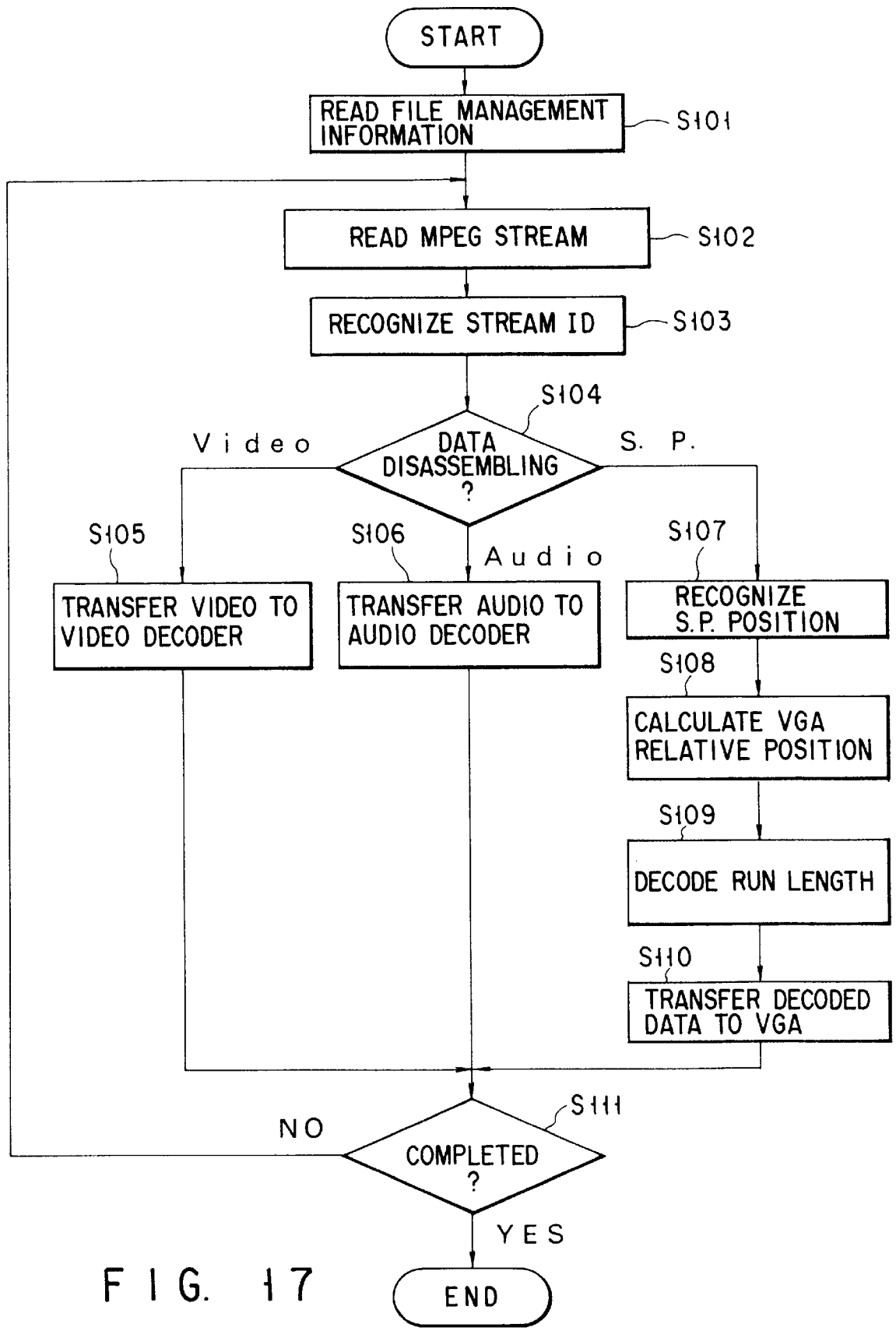
FIG. 17 is a flow chart for explaining a sub-picture decoding operation executed by a CPU in the system of the third embodiment.

The procedures of full-motion video reproducing processing performed by causing the CPU 11 to execute the MPEG driver 121 will be described below with reference to the flow chart of FIG. 17.

First, the CPU 11 reads out file management information from the DVD-ROM drive 21, thereby recognizing the data recording format on the DVD-ROM drive 21 (step S101). Subsequently, the CPU 11 starts to read out a data portion, i.e., an MPEG bit stream from the DVD-ROM drive 21 (step S102). Every time one pack is received, the CPU 11 recognizes the stream ID recorded at the header portion and classifies the MPEG bit stream into a video pack, an audio pack, or a sub-picture pack on the basis of the recognition result (steps S103 and S104).

If the received pack is a video pack, the CPU 11 transfers it to the MPEG2 video decoder 181 (step S105). If the received pack is an audio pack, it is transferred to the audio decoder 183 (step S106).

If the received pack is a sub-picture pack, the CPU 11 recognizes, on the basis of header information added to the sub-picture pack, a position on video where the sub-picture data is synthesized (step S107). Subsequently, the CPU 11 calculates, on the basis of the recognized position on the video and the video display position on the VGA graphics screen, the relative position of the sub-picture data with respect to the VGA graphics screen (step S108). With this processing, an address value used to write the sub-picture data in the video memory 20 is determined.

The CPU 11 decodes the sub-picture and restores the sub-picture to the image before coding on the memory 12 (step S109). Decoding processing executed at this time corresponds to run length coding which has been performed for the sub-picture.

Thereafter, the CPU 11 transfers the sub-picture image on the memory 12 to the multimedia display controller 19 and writes the sub-picture image in the VRAM 20 (step S110).

Processing in steps S102 to S110 is repeatedly executed for MPEG bit streams from the DVD-ROM drive 21 until full-motion video reproduction is completed (step S111).

Figure 15:
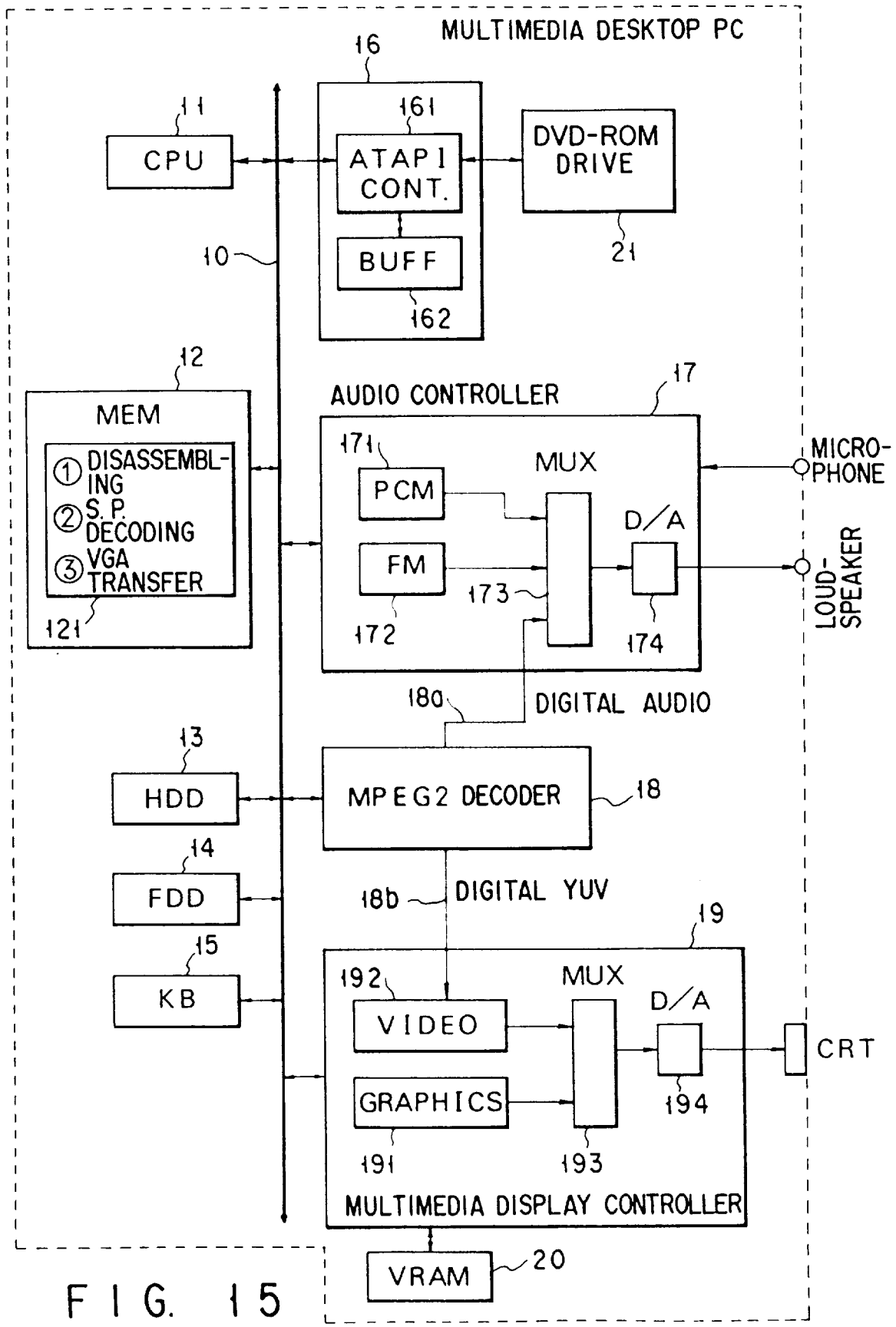
FIG. 15 is a block diagram showing the configuration of a multimedia PC system according to the third embodiment of the present invention.

The data flow in movie reproduction in the system in FIG. 15 will be described below with reference to FIG. 18.

When a transfer command is issued from the CPU 11, an MPEG stream is read out from the DVD-ROM drive 21 and transferred to a data buffer 162 of the ATAPI interface at a transfer rate of 9.5 Mbps. Subsequently, the MPEG stream is sent to the CPU 11, and classification of packs as described in FIG. 18 is performed.

MPEG video is sent to the MPEG2 video decoder 181 and restored to the original main picture before coding. A sub-picture such as a subtitle is restored to a character pattern on the memory 12 by the CPU 11 and sent to the multimedia display controller 19. With this processing, as shown in FIG. 18, the character pattern is drawn at a predetermined position on a color key area (indicated as a hatched area) of VGA graphics. Audio is decoded by the audio decoder 183 and reproduced.

The restored main picture is sent to the multimedia display controller 19 as digital YUV data and synthesized on the color key area (indicated as a hatched area) of the VGA graphics including the sub-picture.

In this manner, the main picture including the subtitle is displayed on the VGA graphics, and the sound is reproduced in synchronism with the picture.

As described above, according to this embodiment, video data and audio data included in an MPEG bit stream read out from the DVD-ROM drive 21 are decoded by the MPEG2 video decoder 181 and the audio decoder 183 incorporated in the system, respectively, although the sub-picture is decoded by software processing by the CPU 11. In this case, the decoded sub-picture is drawn in the VRAM 20 as in normal VGA graphics. The sub-picture image drawn in the VRAM 20 is synthesized with the video from the MPEG2 video decoder 181 by the multimedia display controller 19 and displayed on the screen.

Since the sub-picture is decoded and drawn in the VRAM 20 by software processing by the CPU 11, no logic for decoding the sub-picture is needed in the system, so that the hardware configuration can be simplified.

Figure 19:
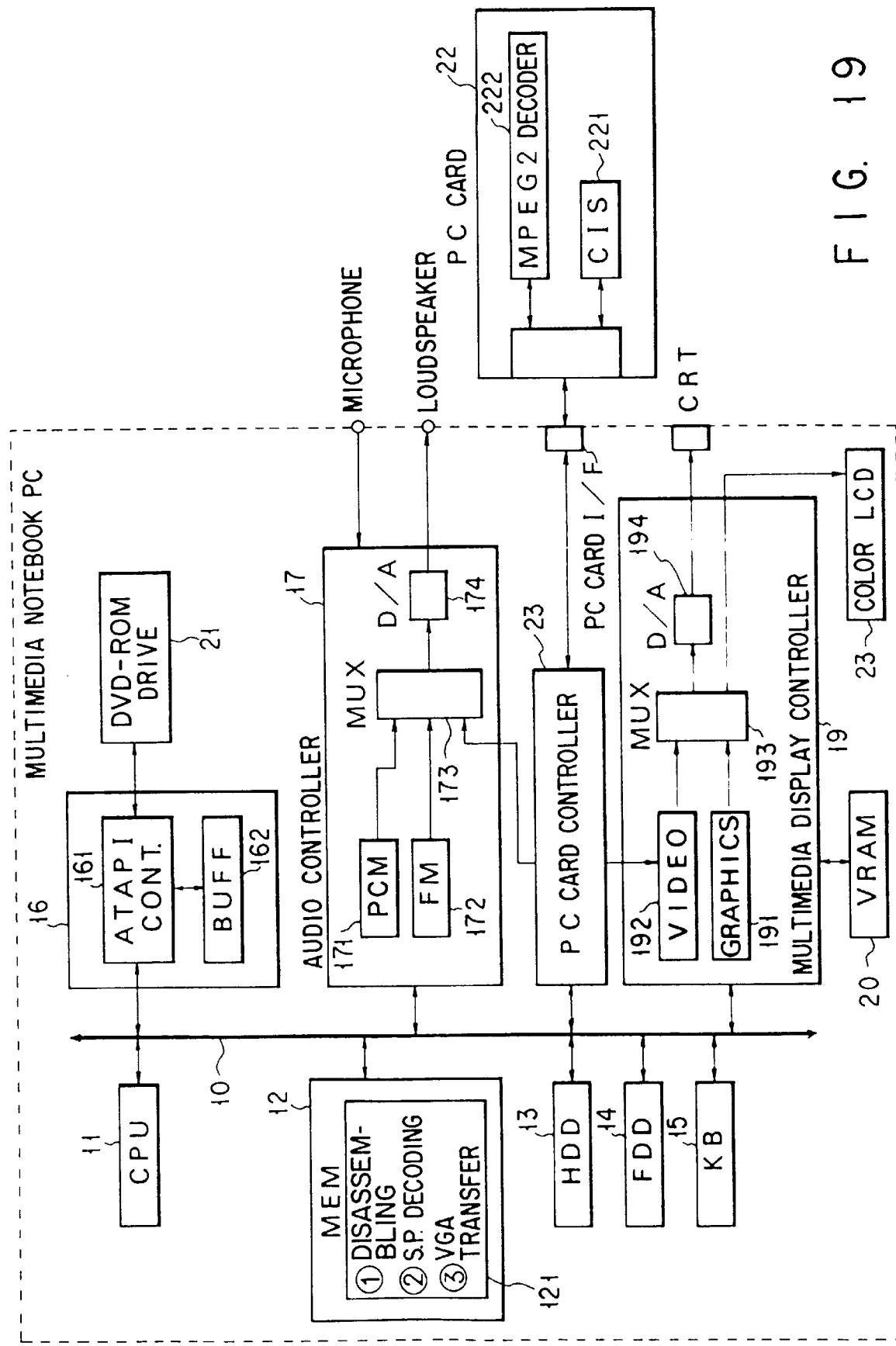
FIG. 19 is a block diagram showing the system configuration of a multimedia PC according to the fourth embodiment of the present invention.

The present invention is not limited to the above embodiments. For example, in the first embodiment shown in FIG. 1, the second embodiment shown in FIG. 12, the third embodiment shown in FIG. 15, and the fourth embodiment shown in FIG. 19, the ATAPI interface 16 is used. However, as shown in FIG. 20, a SCSI interface 31 may be used (only an example wherein the ATAPI interface of the first embodiment in FIG. 1 is replaced with the SCSI interface 31 is shown in FIG. 16, although the second and fourth embodiments can also be constituted as in the embodiment shown in FIG. 20).

Figure 20:
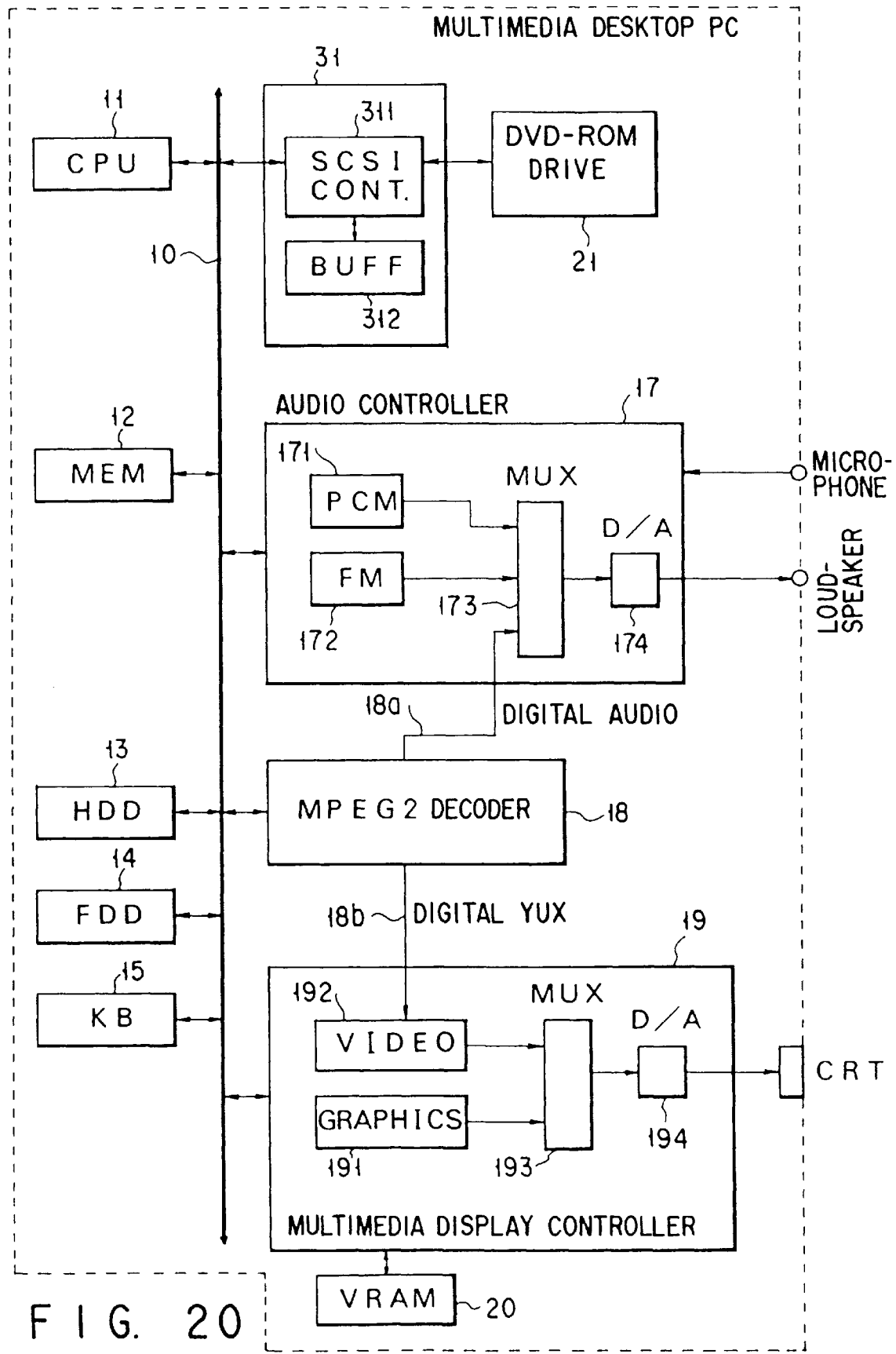
FIG. 20 is a block diagram for explaining the first modification of the first to fourth embodiments shown in FIGS. 1, 12, 15, and 19.

In addition, as shown in FIG. 21, a DVD-ROM drive 41 consisting of a SCSI controller 411 and a buffer 412, which have the same functions as those of a SCSI controller 311 and a buffer 312 shown in FIG. 20, and a drive mechanism 413 may be arranged. A SCSI interface (e.g., an interface of SCSI2 level) 51 consisting of a SCSI controller 511 and a buffer 512 may be further arranged between the DVD-ROM drive 41 and the system bus 10. With this arrangement, an external DVD-ROM drive 81 may be provided to the PC main body, or an expansion HDD 61 or a CD-ROM drive 71 may be connected.

I claim:

1. A computer system comprising:
   a disk drive unit for driving a recording medium in which digitally compressed and coded full-motion video data with sub-picture data is recorded;
   a system bus;
   a display monitor;
   a video decoder connected to said system bus to decode said full-motion video data included in a digital data stream read out from said disk drive unit;
   a sub-video decoder connected to said system bus to decode said sub-picture data included in said digital data stream read out from said disk drive unit; and
   a display controller connected to said system bus to receive said decoded full-motion video and said decoded sub-picture data and to display said full-motion video data with said sub-picture data on a screen of said display monitor.

2. A computer system according to claim 1, wherein digitally compressed and coded sound data is multiplexed with said full-motion video data with said picture data and recorded in said recording medium, and said computer system further comprises an audio decoder connected to said system bus to decode said sound data included in said digital data stream read out from said disk drive unit.

3. A computer system according to claim 2, further comprising an audio controller connected to said system bus to receive said sound data decoded by said audio decoder and to reproduce said sound data.

4. A computer system according to claim 3, further comprising an audio bus for connecting said audio decoder and said audio controller, wherein
   said audio decoder transfers said decoded sound data to said audio controller through said audio bus.

5. A computer system according to claim 4, wherein said audio controller comprises:
   a sound source unit, and
   means for selectively reproducing an output from said sound source unit and said sound data transferred from said audio decoder through said audio bus.

6. A computer system according to claim 1, wherein said full-motion video data is coded at a variable rate and stored in said recording medium of said disk drive unit, and said video decoder comprises means for decoding said full-motion video data coded at said variable rate.

7. A computer system according to claim 6, further comprising a peripheral interface unit including a data buffer to perform data transfer between said computer system and a peripheral unit by using said data buffer, wherein:
   said disk drive unit is connected to said system bus through said peripheral interface unit, and
   a variable rate data transfer of said digital data stream from said disk drive unit to said video decoder is executed through said data buffer of said peripheral interface unit.

8. A computer system according to claim 7, wherein data transfer from said disk drive unit to said data buffer of said peripheral interface unit is executed at a rate substantially equal to a maximum value of a variable data transfer rate from said data buffer to said video decoder.

9. A computer system comprising:
   a disk drive unit storing full-motion video data coded at a variable rate;
   a system bus;
   a display monitor;
   a peripheral interface unit connected to said system bus and including a data buffer, said peripheral interface unit using said data buffer to execute a variable rate data transfer from said disk drive unit to said computer system;
   a video decoder connected to said system bus to decode said full-motion video data coded at said variable rate and transferred from said disk drive unit through said data buffer of said peripheral interface unit; and
   a display controller connected to said system bus to control said display monitor of said computer system, said display controller receiving said decoded full-motion video data from said video decoder and displaying said full-motion video data on a screen of said display monitor.

10. A computer system comprising:
    a disk drive unit for driving a recording medium in which digitally compressed and coded full-motion video data with sub-picture data is recorded thereon;
    a card slot provided in a computer main body;
    a system bus;
    a display monitor;
    a card controller connected to said system bus to control a card mounted in said card slot;
    a card capable of being mounted in said card slot and including a video decoder and a sub-video decoder for decoding said full-motion video data and said sub-picture data included in a digital data stream transferred from said disk drive unit through said card controller; and
    a display controller connected to said system bus to control said display monitor of said computer system, said display controller receiving said full-motion video data and said sub-picture data decoded by said card through said card controller and displaying said full-motion video data with said sub-picture data on a screen of said display monitor.

11. A computer system according to claim 10, wherein:
    digitally compressed and coded sound data is multiplexed with said full recording medium, and
    said card further comprises an audio decoder for decoding said sound data included in said digital data stream read out from said disk drive unit.

12. A computer system according to claim 11, further comprising an audio controller connected to said system bus to receive said sound data decoded by said audio decoder and sound data.

13. A computer system according to claim 12, further comprising:
    an audio bus for connecting said card controller to said audio controller, wherein said card controller transfers said sound data decoded by said audio decoder of said card to said audio controller through said audio bus.

14. A computer system according to claim 13, wherein said audio controller comprises:
    a sound source unit, and
    means for selectively reproducing an output from said source unit and said sound data transferred from said audio decoder through said audio bus.

15. A computer system according to claim 10, wherein:
    said full-motion video data is coded at a variable rate and stored in said recording medium of said disk drive unit, and
    said video decoder comprises means for decoding said full-motion video data coded at said variable rate.

16. A computer system according to claim 15, further comprising:
    a peripheral interface unit including a data buffer to perform a data transfer between said computer system and a peripheral unit by using said data buffer, wherein:
    said disk drive unit is connected to a bus of said computer system through said peripheral interface unit, and
    variable rate data transfer of said digital data stream from said disk drive unit to said video decoder of said card is executed through said data buffer of said peripheral interface unit.

17. A computer system according to claim 16, wherein a data transfer from said disk drive unit to said data buffer of said peripheral interface unit is executed at a rate substantially equal to a maximum value of a variable data transfer rate from said data buffer to said video decoder.

18. A computer system comprising:
    a disk drive unit storing full-motion video data coded at a variable rate;
    a system bus;
    a display monitor;
    a peripheral interface unit connected to said system bus and including a data buffer, said peripheral interface unit using said data buffer to execute a variable rate data transfer from said disk drive unit to said computer system;
    a card slot provided in a computer main body;
    a card controller connected to said system bus to control a card mounted in said card slot;
    a card capable of being mounted in said card slot and including a video decoder for decoding said full motion video data coded at said variable rate and transferred from said disk drive unit through said data buffer of said peripheral interface unit; and
    a display controller connected to said bus to control said display monitor, said display controller receiving said full-motion video data decoded by said video decoder of said card through said card controller and displaying said full-motion video data on a screen of said display monitor.

19. A computer system comprising:
    a drive disk unit capable of driving a recording medium in which digitally compressed and coded full-motion video data with sub-picture data is recorded thereon;

a CPU;

a video memory for storing video data;

a video decoder connected to a bus of said computer system to decode said full-motion video data;

a display controller connected to said bus to synthesize said full-motion video data encoded by said video decoder on graphics drawn in said video memory and to display said full-motion video data on a screen of a display monitor;

means for causing said CPU to decode said sub-picture data included in a digital data stream read out from said disk drive unit; and means for causing said CPU to draw said decoded sub-picture data in said video memory so that said full-motion video data with said sub-picture data is displayed on said screen by said display controller.

20. A computer system according to claim 19, wherein:

said full-motion video data is coded at a variable rate and stored in said recording medium of said disk drive unit, and said video decoder comprises means for decoding said full-motion video data coded at said variable rate.

21. A computer system according to claim 19, further comprising:

a video bus for connecting said video decoder to said display controller, wherein said video decoder transfers said decoded full-motion video data to said display controller through said video bus.

22. A computer system comprising:

a disk drive unit for driving a recording medium in which digitally compressed and coded full-motion video data with sub-picture data is recorded thereon;

a CPU;

a system bus;

a display monitor;

a card slot provided in a computer main body;

a card controller connected to said system bus to control a card mounted in said card slot;

a card capable of being mounted in said card slot and including a video decoder for decoding said full-motion video data;

a display controller connected to said bus to synthesize said full-motion video data decoded by said video decoder of said card on graphics drawn in a video memory and to display said full-motion video data on a screen of said display monitor;

means for causing said CPU to decode said sub-picture data included in a digital data stream read out from said disk drive unit; and means for causing said CPU to draw said decoded sub-picture data in said video memory so that said full-motion video data with said sub-picture data is displayed on said screen by said display controller.

23. A computer system according to claim 22, wherein:

said full-motion video data is coded at a variable rate and stored in said recording medium of said disk drive unit, and said video decoder of said card decodes said full-motion video data coded at said variable rate.

24. A computer system according to claim 22, further comprising:

a video bus for connecting said card controller to said display controller, wherein said card controller transfers said full-motion video data decoded by said video decoder of said card to said display controller through said video bus.

25. A computer system comprising:

a disk drive unit for driving a recording medium in which digitally compressed and coded full-motion video data with sub-picture data is recorded;

a system bus;

a display monitor;

a video decoder connected to said system bus to decode said full-motion video data included in a digital data stream read out from said disk drive unit;

a sub-video decoder connected to said system bus to decode the said sub-picture data included in said digital data stream read out from said disk drive unit;

a video bus for connecting one of said video decoder and said sub-video decoder to said display controller; and a display controller connected to said system bus to receive said decoded full-motion video and said decoded sub-picture data and to display said full-motion video data with said sub-picture data on a screen of said display monitor, wherein one of said video decoder and said sub-video decoder synthesizes said decoded sub-picture data with said decoded full motion video to form synthesized video data and transfers said synthesized video data to said display controller through said video bus.

26. A computer system according to claim 25, wherein said display controller systhesizes video received through said video bus on graphics and displays said video data on said screen.

27. A computer system comprising:

a disk drive unit for driving a recording medium in which digitally compressed and coded full-motion video data with sub-picture data is recorded;

a card slot provided in a computer main body;

a system bus;

a display monitor;

a card controller connected to said system bus to control a card mounted in said card slot;

a card capable of being mounted in said card slot and including a video decoder and a sub-video decoder for decoding said full-motion video data and said sub-picture data included in a digital data stream transferred from said disk drive unit through said card controller;

a video bus for connecting said card controller to said display controller, wherein said card controller synthesizes said sub-picture data decoded by said sub-video decoder with said full-motion video data decoded by said video decoder of said card to form synthesized video data and transfers said synthesized video data to said display controller through said video bus; and a display controller connected to said system bus to control said display monitor of said computer system, said display controller receiving said full-motion video data and said sub-picture data decoded by said card through said card controller and displaying said full motion video data with said sub-picture data on a screen of said display monitor.

28. A computer system according to claim 27, wherein said display controller synthesizes said synthesized video data received through said video bus on graphics data to form second synthesized video data and displays said second synthesized video data on said screen.

29. A computer system comprising:
  a disk drive unit capable of driving a recording medium in which digitally compressed and coded full-motion video data with sub-picture data is recorded;
  a CPU;
  a system bus;
  a video memory for storing video data;
  a video decoder connected to a bus of said computer system to decode said full-motion video data;
  an audio decoder connected to said system bus to decode sound data;
  means for causing said CPU to separate a digital data stream read out from said disk drive unit into said sub-picture data, said full-motion video data, and said sound data and transfer said separated full-motion video data and said sound data to said video decoder and said audio decoder, respectively;
  a display controller connected to said bus to synthesize said full-motion video data decoded by said video decoder on graphics drawn in said video memory and to display said full-motion video data on a screen of a display monitor;
  means for causing said CPU to decode said sub-picture data included in said digital data stream read out from said disk drive;
  means for causing said CPU to draw said decoded sub-picture data in said video memory so that said full-motion video data with said sub-picture data is displayed on said screen by said display controller, wherein
  said sound data is digitally compressed, coded and multiplexed with said full-motion video data with said sub-picture data and recorded in said recording medium thereon.

30. A computer system according to claim 29, further comprising an audio controller connected to said system bus to control audio reproduction, said audio controller receiving said sound data decoded by said audio decoder and reproducing said sound data.

31. A computer system according to claim 30, further comprising:
  an audio bus for connecting said audio decoder to said audio controller, wherein
  said audio decoder transfers said decoded sound data to said audio controller through said audio bus.

32. A computer system according to claim 30, wherein said audio controller comprises:
  a sound source unit, and
  means for selectively reproducing an output from said sound source unit and said sound data transferred from said audio decoder through said audio bus.

33. A computer system comprising:
  a disk drive unit for driving a recording medium in which digitally compressed and coded full-motion video data with sub-picture data is recorded thereon;
  a CPU;
  a system bus;
  a display monitor;
  a card slot provided in a computer main body;
  a card controller connected to said system bus to control a card mounted in said card slot;
  an audio decoder provided in said card to decode sound data;
  means for causing said CPU to separate a digital data stream read out from said disk drive unit into said sub-picture data, said full-motion video data, and said sound data and for transferring said separated full-motion video data and said sound data to said card,
  a card capable of being mounted in said card slot and including a video decoder for decoding said full-motion video data;
  a display controller connected to said bus to synthesize said full-motion video data decoded by said video decoder of said card on graphics drawn in a video memory and to display said full-motion video data on a screen of said display monitor;
  means for causing said CPU to decode said sub-picture data included in said digital data stream read out from said disk drive unit and
  means for causing said CPU to draw said decoded sub-picture in said video memory so that said full-motion video data with said sub-picture data is displayed on said screen by said display controller, wherein
  said sound data, which is digitally compressed and coded, is multiplexed with said full-motion video data with said sub-picture data and recorded in said recording medium thereon.

34. A computer system according to claim 33, further comprising an audio controller connected to said system bus to control audio reproduction, said audio controller receiving said sound data decoded by said audio decoder of said card and reproducing said sound data.

35. A computer system according to claim 34, further comprising:
  audio bus for connecting said card controller to said audio controller, wherein
  said card controller transfers said sound data decoded by said audio decoder of said card to said audio controller through said audio bus.

36. A computer system according to claim 34, wherein said audio controller comprises:
  a sound source unit, and
  means for selectively reproducing an output from said sound source unit and said sound data transferred from said audio decoder through said audio bus.

37. A computer system comprising:
  a disk drive unit capable of driving a recording medium in which digitally compressed and coded full-motion video data with sub-picture data is recorded thereon;
  a CPU;
  a video memory for storing video data;
  a video decoder connected to a bus of said computer system to decode said full-motion video data;
  means for causing said CPU to separate a digital data stream read out from said disk drive unit into said sub-picture data and said full-motion video data and transfer said separated full-motion video data to said video decoder;
  a display controller connected to said bus to synthesize said full-motion video data decoded by said video decoder on graphics drawn in said video memory and to display said full-motion video data on a screen of a display monitor;
  means for causing said CPU to decode said sub-picture data included in said digital data stream read out from said disk drive unit; and
  means for causing said CPU to draw said decoded sub-picture data in said video memory so that said full-motion video data with said sub-picture data is displayed on said screen by said display controller.

38. A computer system comprising:

a disk drive unit for driving a recording medium in which digitally compressed and coded full-motion video data with sub-picture data is recorded;

a CPU;

a system bus;

a display monitor;

a card slot provided in a computer main body;

means for causing said CPU to separate a digital data stream read out from said disk drive unit into said sub-picture data and said full-motion video data and for transferring said separated full-motion video data to said video decoder of said card;

a card controller connected to said system bus to control a card mounted in said card slot;

a card capable of being mounted in said card slot and including a video decoder for decoding said full-motion video data;

a display controller connected to said bus to synthesize said full-motion video data decoded by said video decoder of said card on graphics drawn in a video memory and to display said full-motion video data on a screen of said display monitor;

means for causing said CPU to decode said sub-picture data included in said digital data stream read out from said disk drive unit; and means for causing said CPU to draw said decoded sub-picture data in said video memory so that said full-motion video data with said sub-picture data is displayed on said screen by said display controller.

39. A computer system comprising:

a disk drive unit for driving a recording medium in which digitally compressed and coded full-motion video data with sub-picture data is recorded, said full-motion video data being coded at a variable bit rate and stored in said recording medium of said disk drive unit;

a system bus;

a display monitor;

a video decoder connected to said system bus to decode said full-motion video data coded at said variable rate and included in a digital data stream read out from said disk drive unit;

an ATA packet interface (ATAPI) to perform a data transfer between said computer system and a peripheral unit;

a sub-video decoder connected to said system bus to decode sub-picture data included in said digital data stream read out from said disk drive unit; and a display controller connected to said system bus to receive said decoded full-motion video data and said decoded sub-picture data and data to display said full-motion video data with said sub-picture data on a screen of said display monitor, wherein said disk drive unit is connected to said system bus through said ATAPI, and a variable rate data transfer of said digital data stream from said disk drive unit to said video decoder is executed through said ATAPI.

40. A computer system comprising:

a disk drive unit for driving a recording medium in which digitally compressed and coded full-motion video data with sub-picture data is recorded, said full-motion video data being coded at a variable bit rate and stored in said recording medium of said disk drive unit;

a system bus;

a display monitor ;

a video decoder connected to said system bus to decode said full-motion video data coded at said variable rate and included in a digital data stream read out from said disk drive unit;

a small computer system interface (SCSI) to perform a data transfer between said computer system and a peripheral unit;

a sub-video decoder connected to said system bus to decode said sub-picture data included in said digital data stream read out from said disk drive unit; and a display controller connected to said system bus to receive said decoded full-motion video data and said decoded sub-picture data and to display said full-motion video data with said sub-picture data on a screen of said display monitor, wherein said disk drive unit is connected to said system bus through said SCSI, and a variable rate data transfer of said digital data stream from said disk drive unit to said video decoder is executed through said SCSI.

\* \* \* \* \*